US009692584B2

(12) United States Patent
Siomina et al.

(10) Patent No.: US 9,692,584 B2
(45) Date of Patent: Jun. 27, 2017

(54) METHODS OF RADIO COMMUNICATIONS USING DIFFERENT SUBFRAME CONFIGURATIONS AND RELATED RADIO AND/OR NETWORK NODES

(71) Applicant: TELEFONAKTIEBOLAGET L M ERICSSON (PUBL), Stockholm (SE)

(72) Inventors: Iana Siomina, Solna (SE); Muhammad Kazmi, Bromma (SE)

(73) Assignee: TELEFONATIEBOLAGET L M ERICSSON (PUBL), Stockholm (SE)

( * ) Notice: Subject to any disclaimer, the term of this patent is extended or adjusted under 35 U.S.C. 154(b) by 248 days.

(21) Appl. No.: 14/156,186

(22) Filed: Jan. 15, 2014

(65) Prior Publication Data

US 2014/0198680 A1    Jul. 17, 2014

Related U.S. Application Data

(60) Provisional application No. 61/753,746, filed on Jan. 17, 2013.

(51) Int. Cl.
*H04L 5/14* (2006.01)
*H04L 5/16* (2006.01)
*H04W 28/18* (2009.01)

(52) U.S. Cl.
CPC ............... *H04L 5/16* (2013.01); *H04L 5/14* (2013.01); *H04W 28/18* (2013.01); *H04L 5/1469* (2013.01)

(58) Field of Classification Search
CPC .................... H04L 5/00; H04L 5/14
See application file for complete search history.

(56) References Cited

U.S. PATENT DOCUMENTS 9,030,974 B2 * 5/2015 Yang ............... H04W 72/042
                                                370/280
2009/0059820 A1 * 3/2009 Jung ................. H04L 5/003
                                                370/280

(Continued)

FOREIGN PATENT DOCUMENTS

CN    102255718 A    11/2011
EP    2733883 A1    5/2014

(Continued)

OTHER PUBLICATIONS

International Search Report for International Application No. PCT/IB2014/058362 mailed Apr. 28, 2014, 3 pages.

(Continued)

*Primary Examiner* — Michael Thier
*Assistant Examiner* — Zhensheng Zhang
(74) *Attorney, Agent, or Firm* — Sage Patent Group

(57) ABSTRACT

A method may be provided in a radio node capable of operating in a Radio Access Network according to at least first and second UpLink/DownLink subframe configurations that are different. The first UpLink/DownLink subframe configuration and the second UpLink/DownLink subframe configuration may be used for operation in a first cell and a second cell respectively, and/or the first UpLink/DownLink subframe configuration and the second UpLink/DownLink subframe configuration may be used in the first cell or the second cell at non-overlapping times. A configuration message may be received at the radio node relating to the first UpLink/DownLink subframe configuration and/or the second UpLink/DownLink subframe configuration. An operation may be performed at the radio node on signals transmitted to and/or received from the first cell and/or the second cell based on the configuration message relating to the first (Continued)

UpLink/DownLink subframe configuration and/or the second UpLink/DownLink subframe configuration.

30 Claims, 7 Drawing Sheets

(56) References Cited

U.S. PATENT DOCUMENTS

| | | | |
|---|---|---|---|
| 2009/0296609 | A1 | 12/2009 | Choi et al. |
| 2010/0290374 | A1 | 11/2010 | Chin et al. |
| 2011/0222445 | A1 | 9/2011 | Alanara |
| 2012/0327821 | A1 | 12/2012 | Lin et al. |
| 2013/0170406 | A1 | 7/2013 | Kishiyama |
| 2013/0188510 | A1* | 7/2013 | Siomina ............ H04W 24/10 370/252 |
| 2013/0343239 | A1* | 12/2013 | Damnjanovic ......... H04L 5/001 370/280 |

FOREIGN PATENT DOCUMENTS

| | | |
|---|---|---|
| JP | 2012-54711 A | 3/2012 |
| WO | WO 2012/044246 A1 | 4/2012 |
| WO | WO 2012/065287 A1 | 5/2012 |
| WO | WO 2012/109195 A2 | 8/2012 |
| WO | WO 2012/173561 A2 | 12/2012 |
| WO | WO 2012/175030 A1 | 12/2012 |

OTHER PUBLICATIONS

Nortel: "eNB knowledge of HD-FDD UE capability" 3GPP Draft; R2-082245 HD-FDD Terminals, 3$^{rd}$ Generation Partnership Project, Mobile Competence Centre; 650, Route des Lucioles, F-06921 Sophia-Antipolis Cedex, France; vol. RAN WG2, No. Kansas City, May 5-9, 2008.

U.S. Appl. No. 61/496,327 "Method and Apparatus for Configuring Enhanced Timing Measurements Involving Multifarious Links," filed Jun. 13, 2011.

3GPP TS 36.211 V10.1.0 (Mar. 2011) "3$^{rd}$ Generation Partnership Project; Technical Specification Group Radio Access Network; Evolved Universal Terrestrial Radio Access (E-UTRA); Physical Channels and Modulation" (Release 10); 103 pp.

3GPP TS 36.211 V12.0.0 (Dec. 2013) "3$^{rd}$ Generation Partnership Project; Technical Specification Group Radio Access Network; Evolved Universal Terrestrial Radio Access (E-UTRA); Physical Channels and Modulation" (Release 12); 120 pp.

3GPP TS 36.214, V10.1.0 (Mar. 2011); "3$^{rd}$ Generation Partnership Project; Technical Specification Group Radio Access Network; Evolved Universal Terrestrial Radio Access (E-UTRA); Physical Layer; Measurements" (Release 10); 13 pages.

Damnjanovic et al., "Data Transmission in Carrier Aggregation With Different Carrier Configurations", U.S. Appl. 61/663,468, filed Jun. 22, 2012.

3GPP, Technical Specification—"3rd Generation Partnership Project; Technical Specification Group Radio Access Network; Evolved Universal Terrestrial Radio Access (E-UTRA); Requirements for support of radio resource management (Release 11)", 3GPP TS 36.133 V11.3.0 (Dec. 2012), pp. 1, 114-115, 134.

3GPP, Technical Specification—"3rd Generation Partnership Project; Technical Specification Group Radio Access Network; Evolved Universal Terrestrial Radio Access (E-UTRA); Physical Channels and Modulation (Release 11)", 3GPP TS 36.211 V11.1.0 (Dec. 2012), pp. 1, 10-12.

3GPP, Technical Specification—"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0 (Sep. 2012), pp. 1, 178-214, 247-262.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

UL/DL Configurations Defined in 3GPP

Positioning Architecture in LTE (does not cover UL Positioning)

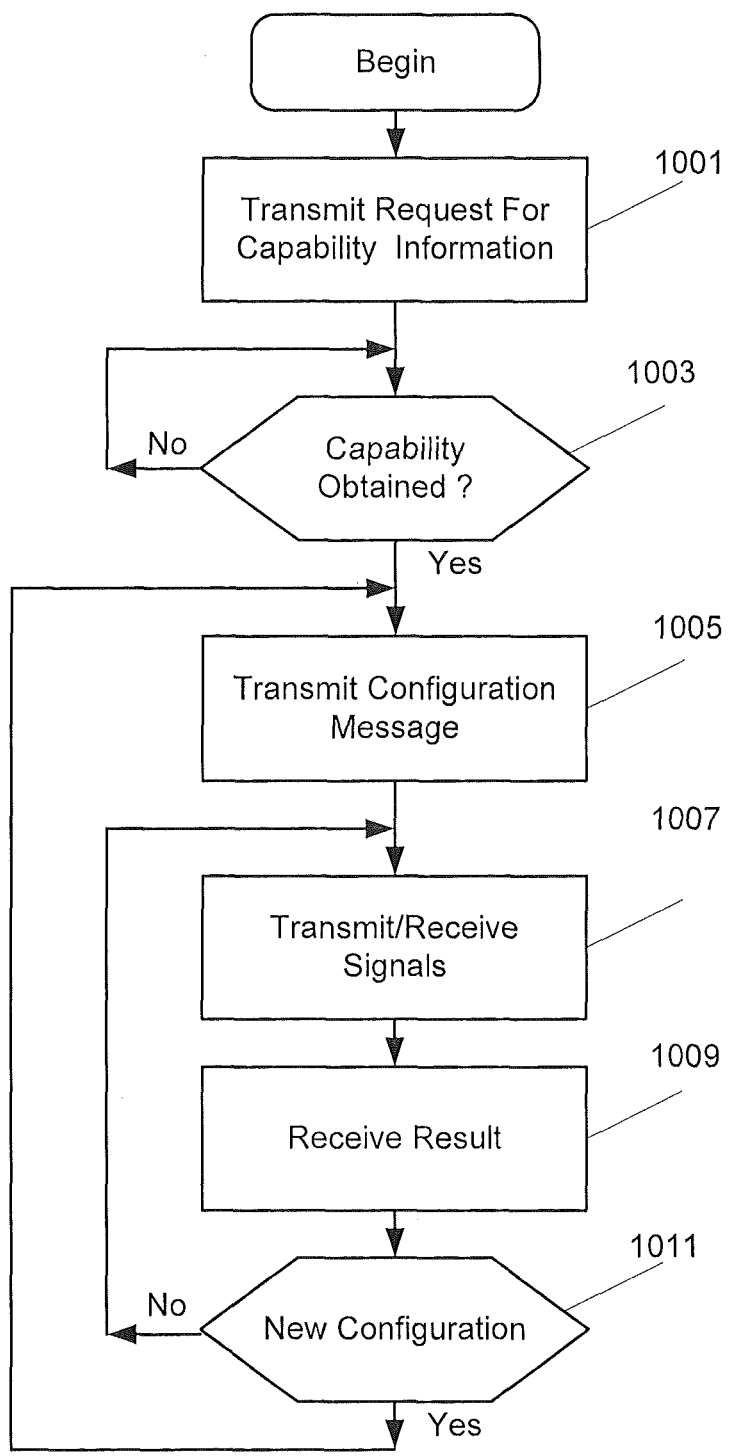

METHODS OF RADIO COMMUNICATIONS USING DIFFERENT SUBFRAME CONFIGURATIONS AND RELATED RADIO AND/OR NETWORK NODES

CROSS REFERENCE TO RELATED APPLICATION

The present application claims the benefit of priority from U.S. Provisional Application No. 61/753,746 filed Jan. 17, 2013, the disclosure of which is hereby incorporated herein in its entirety by reference.

TECHNICAL FIELD

The present disclosure relates to wireless communication networks, and in particular, to networks using different subframe configurations and related nodes and methods.

BACKGROUND

Duplex Configuration

A duplex communication system is a point-to-point system supporting communications between two parties or devices in both directions.

A half-duplex (HDX) system supports communications between two parties or devices in both directions, but in only one direction at a time (not simultaneously). A full-duplex (FDX), or sometimes double-duplex system, supports communications between two parties or devices in both directions at the same time (simultaneously).

Time-division duplexing (TDD) is the application of time-division multiplexing to separate outward and return signals but on the same carrier frequency, i.e., operating over a half-duplex communication link.

Frequency-division duplexing (FDD) means that the transmitter and receiver operate at different carrier frequencies, typically separated by a frequency offset.

The Long Term Evolution (LTE) standard provides for both FDD and TDD operation modes. Additionally, half duplex operation is also specified, which is essentially an FDD operation mode but with transmission and reception not occurring simultaneously, similar to TDD schemes. Half-duplex mode may have advantages with some frequency arrangements where a duplex filter may not be reasonable, e.g., resulting in relatively high cost and/or relatively high power consumption. Since a carrier frequency number (EARFCN or EUTRA Absolute Radio Frequency Channel Number) is unique, by knowing it, it is possible to determine the frequency band, which corresponds to either FDD or TDD. However, it may be more difficult to detect the difference between full-duplex FDD and half-duplex FDD (HD-FDD) without explicit information since a same FDD band can be used as full FDD or HD-FDD.

In 3GPP, two radio frame structure types are currently supported: Type 1 (applicable to FDD) and Type 2 (applicable to TDD).

Transmissions in multiple cells can be aggregated where up to four secondary cells can be used in addition to the primary cell. In case of multi-cell aggregation, the UE (also referred to as a user equipment node and/or a wireless device/terminal) currently assumes the same frame structure is used in all the serving (primary and secondary) cells.

FDD

Frame structure type 1 is applicable to both full duplex and half duplex FDD, and frame structure type 1 may be provided as illustrated in FIG. 1.

For FDD, 10 subframes are available for downlink transmission and 10 subframes are available for uplink transmissions in each 10 ms interval. Uplink (UL) and downlink (DL) transmissions are separated in the frequency domain in that the UL and DL transmissions take place over different carrier frequencies. In half-duplex FDD operation, the UE cannot transmit and receive at the same time while there are no such restrictions in full-duplex FDD. There is no need for guard periods for full-duplex FDD. For half-duplex FDD operation, a guard period is created by the UE by not receiving at least the last part of a downlink subframe immediately preceding an uplink subframe from the same UE.

TDD

The frame structure type 2, applicable for TDD, is as illustrated in FIG. 2.

UL/DL TDD Configurations

The table of FIG. 3 illustrates UL/DL TDD configurations defined so far in 3GPP ($3^{rd}$ Generation Partnership Project), where, for each subframe in a radio frame: "D" denotes the subframe is reserved for downlink transmissions; "U" denotes the subframe is reserved for uplink transmissions; and "S" denotes a special subframe with the three fields DwPTS (the downlink part of the special subframe for TDD operations), GP (TDD guard period), and UpPTS (the uplink part of the special subframe for TDD operations). Choosing a specific UL/DL configuration may be determined, e.g., based on traffic demand in DL and/or UL and/or network capacity in DL and/or UL.

Subframes 0 and 5 and DwPTS are always reserved for downlink transmission. UpPTS and the subframe immediately following the special subframe are always reserved for uplink transmission.

The length of DwPTS and UpPTS depends on the combination of DL and UL cyclic prefix lengths and on the special subframe configuration (10 pre-defined special subframe configurations are defined in TS 36.211). Typically, DwPTS is longer than UpPTS.

In case multiple cells are aggregated, the UE may assume that the guard period of the special subframe in the different cells have an overlap of at least $1456T_s$.

Existing Capabilities Related to Duplex Configuration Support

Supported RF (Radio Frequency) Band(s)

Radio network nodes and UEs typically may not support all RF bands (aka operating frequency bands), but a subset of the RF bands. Currently, the RF bands supported by the UE may be signaled to the serving eNB (also referred to as an eNodeB and/or a base station) or positioning node (E-SMLC or Evolved Serving Mobile Location Center). Base stations typically declare supported RF bands; although some radio network nodes, e.g., LMUs (Location Measurement Units), may signal the RF bands they support to another node (e.g., a positioning node). An RF band and a duplex mode may be indirectly indicated by the carrier frequency number (EARFCN), which is unique, and by knowing the carrier frequency number, the frequency band it belongs to may be determined. The RF band, in turn, is either FDD or TDD, though it may not be possible to tell from EARFCN whether it is FDD or HD-FDD.

Half-Duplex FDD (HD-FDD) Capability

The HD-FDD capability for UEs has been discussed, e.g., for low-cost devices. From the network side, HD-FDD may be supported by means of scheduling, which would also allow the radio network nodes to support both non HD-FDD and normal FDD UEs.

DL (DownLink) CA (Carrier Aggregation) with different UL/DL TDD configurations.

In Rel-11, this capability becomes mandatory for all Rel-11 UEs supporting TDD and inter-band CA (DL only).

Network Deployments Using Non-Full Duplex Operation Modes

Non-full duplex operation modes, e.g., HD-FDD or TDD, may have some advantages such as lower device complexity (e.g., no need for duplex filter), channel reciprocity (the channel estimates on UL may very well reflect the channel in DL, especially for slow-varying channels), and possibility to better adapt spectrum utilization to unbalanced DL and UL traffic. A typical disadvantage, however, may be the generated co-channel interference and even inter-channel/inter-band interference, which may require, for example, additional rather large guard bands to reduce unwanted emissions to other systems.

Examples of deployments using non-full duplex operation modes are discussed below. Proposed deployments may also provide means to enable and/or improve performance in such deployments, without precluding also other deployments.

Single-Carrier and Multi-Carrier Deployments

Non-full duplex operation may be used in single-carrier or multi-carrier deployments, with the same or different duplex configurations or even different duplex modes (e.g., FDD and TDD) in different carriers, which may be determined by the spectrum availability in the area, wireless communications system purpose, services, and traffic needs.

Dynamic TDD

Typically dynamic TDD operation refers to changing TDD configurations over a time period on a carrier of a single-carrier or multi-carrier deployment, but such operation may also be implemented over multiple carriers.

Different UL/DL Configurations

It has been agreed in 3GPP, that all UEs should support different UL/DL configurations on different bands. This applies for non-CA operation, but also for inter-band CA (currently the UEs support DL CA for inter-band, but UL CA for inter-band is likely to be supported in a later release too). As mentioned earlier, a specific UL/DL configuration may be decided based on different factors, e.g., traffic demand in DL and/or UL.

In the current standard, different UL/DL configurations in different cells are assumed to be statically configured. Different UL/DL configurations may be configured statically or dynamically in different bands, only in presence of a sufficient inter-band separation. Indeed, the possibility of having different UL/DL configurations can also give more flexibility for dynamic TDD and hence can be combined with the latter, which, however, would make interference coordination in the network more challenging in case of insufficient separation between bands or especially on the same carrier.

Small Cells and Heterogeneous Deployments

The interest in deploying low-power nodes (such as pico base stations, home eNodeBs, relays, remote radio heads, etc.) for enhancing the macro network performance in terms of the network coverage, capacity and service experience of individual users has been constantly increasing over the last few years. At the same time, a need has been recognized for enhanced interference management techniques to address arising interference issues caused, for example, by significant transmit power variation among different cells and cell association techniques developed earlier for more uniform networks.

In 3GPP, heterogeneous network deployments have been defined as deployments where low-power nodes of different transmit powers are placed throughout a macro-cell layout, implying also non-uniform traffic distribution. Such deployments, for example, may be effective for capacity extension in certain areas, so-called traffic hotspots, i.e., small geographical areas with a higher user density and/or higher traffic intensity where installation of pico nodes can be considered to enhance performance. Heterogeneous deployments may also be viewed as a way of densifying networks to adapt to the traffic needs and the environment. However, heterogeneous deployments may also bring challenges for which the network has to be prepared to ensure efficient network operation and superior user experience. Some challenges are related to increased interference in the attempt to increase small cells associated with low-power nodes, also known as cell range expansion. Other challenges are related to potentially high interference in uplink due to a mix of large and small cells.

According to 3GPP, heterogeneous deployments consist of deployments where low power nodes are placed throughout a macro-cell layout. The interference characteristics in a heterogeneous deployment can be significantly different than in a homogeneous deployment, in downlink or uplink or both. Examples of such interference in heterogeneous deployments are illustrated in FIG. 4, where in case (a), a macro user UE-a with no access to the Closed Subscriber Group (CSG) cell may experience interference from the HeNodeB low power node LPN-a, in case (b) a macro user UE-B may generate severe interference for the HeNodeB low power node LPN-b, in case (c) a CSG user UE-C may receive interference from another CSG HeNodeB low power node LPN-c, and in case (d) a UE UD-d may be served by a pico cell LPN-d in the expended cell range area ECR. In general, a heterogeneous deployment does not necessarily involve CSG cells.

One of the baseline deployments for LTE Rel-12 is a deployment with small cells deployed on a separate carrier. It is also expected that traffic patterns may be quite different in small cells, which may justify different duplex modes and even different duplex configurations (if the same mode is used) on the carrier with macro cells and the carrier with small cells.

Positioning Architecture in LTE

As shown in FIG. 5, three significant network elements in an LTE (Long Term Evolution) positioning architecture include the LCS (Location Service) Client, the LCS target, and the LCS Server. The LCS Server is a physical or logical entity managing positioning for a LCS target device by collecting measurements and other location information, assisting the wireless device/terminal (UE) in measurements when necessary, and estimating the LCS target location. A LCS Client is a software and/or hardware entity that interacts with a LCS Server for the purpose of obtaining location information for one or more LCS targets, i.e., the entities being positioned. LCS Clients may also reside in the LCS targets themselves. An LCS Client sends a request to LCS Server to obtain location information, and the LCS Server processes and serves the received requests and sends the positioning result and optionally a velocity estimate to the LCS Client. A positioning request can be originated from the wireless device/terminal or a network node or external client.

Position calculation can be conducted, for example, by a positioning server (e.g., E-SMLC or SLP or Secure User Plane Location Location Location Platform in LTE) or UE. The former approach corresponds to the UE-assisted positioning mode, while the latter corresponds to the UE-based positioning mode.

Two positioning protocols operating via the radio network exist in LTE, LPP (LTE Positioning Protocol) and LPPa. The LPP is a point-to-point protocol between a LCS Server and a LCS target device, used to position the UE (aka target device). LPP can be used both in the user and control plane, and multiple LPP procedures are allowed in series and/or in parallel thereby reducing latency. LPPa is a protocol between eNodeB and LCS Server specified only for control-plane positioning procedures, although it still can assist user-plane positioning by querying eNodeBs for information and eNodeB measurements. SUPL (Secure User Plane Location) protocol is used as a transport for LPP in the user plane. LPP has also a possibility to convey LPP extension messages inside LPP messages, e.g., currently OMA (Open Mobile Alliance) LPP extensions are being specified (LPPe) to allow, for example, for operator-specific assistance data or assistance data that cannot be provided with LPP or to support other position reporting formats or new positioning methods.

A high-level architecture, as it is currently standardized in LTE, is illustrated in FIG. 6, where the LCS target is a wireless device/terminal UE, and the LCS Server is an E-SMLC or an SLP. In FIG. 6, the control plane positioning protocols (e.g., LPP, LPPa, and LCS-AP) are shown terminating (at one end) at E-SMLC, and the user plane positioning protocol (e.g., SUPL/LPP) is shown terminating (at one end) at SLP. The SLP may comprise two components/elements, SPC (SUPL Location Center) and SLC (SUPL Location Platform), which may also reside in different nodes. In an example embodiment, SPC has a proprietary interface with E-SMLC, and L1p interface with SLC, and the SLC part of SLP communicates with P-GW (PDN-Gateway or Packet Data Network Gateway) and External LCS Client.

Additional positioning architecture elements may also be deployed to further enhance performance of specific positioning methods. For example, deploying radio beacons may be a cost-efficient solution which may significantly improve positioning performance indoors and also outdoors by allowing more accurate positioning, for example, with proximity location techniques.

For UL positioning (e.g., UTDOA or Uplink-Time Difference of Arrival), location measurement units (LMUs) may also be included in the positioning architecture (see FIG. 5). The LMUs may be, for example, standalone, integrated into eNodeB, or co-sited with an eNodeB. In LTE, UTDOA measurements, UL RTOA (Relative Time of Arrival), are performed on Sounding Reference Signals (SRS). To detect an SRS signal, an LMU needs a number of SRS parameters to generate the SRS sequence which is to be correlated to receive signals. SRS parameters would have to be provided in the assistance data transmitted by positioning node to LMU. This assistance data would be provided via LMUp. However, these parameters are generally not known to the positioning node, which may then need to obtain this information from an eNodeB configuring the SRS to be transmitted by the UE and measured by LMU. This information may have to be provided using LPPa or a similar protocol.

In networks where a non-full duplex mode (e.g., TDD or HD-FDD) is used, performing measurements with different UL/DL (UpLink/DownLink) subframe configurations in such networks may be difficult.

Approaches described in this Background section could be pursued, but are not necessarily approaches that have been previously conceived or pursued. Therefore, unless otherwise expressly stated herein, the approaches described in this Background section are not prior art to the claims in this application and are not admitted to be prior art by inclusion in this section.

SUMMARY

According to some embodiments disclose herein, a method may be provided in a radio node capable of operating in a Radio Access Network according to at least first and second UpLink/DownLink subframe configurations, wherein the first and second UpLink/DownLink subframe configurations are different. The first UpLink/DownLink subframe configuration and the second UpLink/DownLink subframe configuration may be used for operation in a first cell and a second cell respectively, and/or the first UpLink/DownLink subframe configuration and the second UpLink/DownLink subframe configuration may be used in the first cell or the second cell at non-overlapping times. A configuration message may be received at the radio node relating to the first UpLink/DownLink subframe configuration and/or the second UpLink/DownLink subframe configuration. An operation may be performed at the radio node on signals transmitted to and/or received from the first cell and/or the second cell based on the configuration message relating to the first UpLink/DownLink subframe configuration and/or the second UpLink/DownLink subframe configuration.

Some embodiments may thus enable the radio access network to be aware of a measuring node's (e.g., a wireless device's) ability to perform measurements on/using cells operating with different UL/DL subframe configurations. Moreover, the measuring node (e.g., the wireless device) may be able to meet pre-defined requirements when performing measurements on cells with different UL/DL subframe configurations. This may in turn improve overall system/network performance. In addition, the network may be more aware of the performance of measurements performed by the measuring node (e.g., the wireless device) on cells with different UL/DL subframe configurations. This may in turn leads to increased network operational flexibility by providing different UL/DL subframe configurations according to traffic demand.

The first UpLink/DownLink subframe configuration may be a frequency division duplex (FDD) subframe configuration, and the second UpLink/DownLink subframe configuration comprises a time division duplex (TDD) subframe configuration.

The first UpLink/DownLink subframe configuration may be a first time division duplex (TDD) subframe configuration, and the second UpLink/DownLink subframe configuration may be a second time division duplex (TDD) subframe configuration.

The first UpLink/DownLink subframe configuration may be a first half duplex frequency division duplex (HD-FDD) subframe configuration, and the second UpLink/DownLink subframe configuration may be a second half duplex frequency division duplex (HD-FDD) subframe configuration.

The first UpLink/DownLink subframe configuration may be a half duplex frequency division duplex (HD-FDD) subframe configuration, and the second UpLink/DownLink subframe configuration may be a time division duplex (TDD) subframe configuration.

The first UpLink/DownLink subframe configuration may be a half duplex frequency division duplex (HD-FDD) subframe configuration, and the second UpLink/DownLink subframe configuration may be a frequency division duplex (FDD) subframe configuration.

The configuration message may be a first configuration message identifying the first UpLink/DownLink subframe configuration for operations at the radio node, and performing the operation may include performing a first operation based on the first configuration message identifying the first UpLink/DownLink subframe configuration. In addition, a second configuration message identifying the second UpLink/DownLink subframe configuration for operations at the radio node may be received, and a second operation may be performed at the radio node based on the second configuration message identifying the second UpLink/DownLink subframe configuration.

Performing the first operation may include performing a first measurement based on the first UpLink/DownLink subframe configuration, and performing the second measurement may include performing a second measurement based on the second UpLink/DownLink subframe configuration.

Performing the operation may include performing a measurement based on the configuration message relating to the first UpLink/DownLink subframe configuration and/or the second UpLink/DownLink subframe configuration.

The measurement may include at least one of a timing measurement, a received signal measurement, a received quality measurement, a direction measurement, a channel state measurement, and/or a positioning measurement.

Moreover, the radio node may be a first radio node (e.g., a wireless device), and a result of the operation may be transmitted to a second radio node (e.g., a base station) over a wireless channel.

The radio node may include a first radio node, and receiving the configuration message may include receiving the configuration message from a second radio node over a radio interface. In addition, a capability message may be transmitted to the second radio node wherein the capability message defines a capability of the first radio node relating to performing the radio operation on signals related to the first cell and/or the second cell. The capability of the first radio network node may include a capability of operating with dynamic UpLink/DownLink subframe configurations.

Receiving (901) a request for capability information may be received from the second node, and transmitting the capability message may include transmitting the capability message responsive to receiving the request for the capability information.

A result of the operation at the radio node based on the configuration message may be used to perform at least one of measurement reporting, positioning, cell reselection, radio resource management, self organization, minimization of drive tests, mobility, interference coordination, and/or receiver tuning Performing an operation at the radio node based on the configuration message may include at least one of receiving a radio signal, performing a measurement, performing channel estimation, sensing spectrum, receiving data, and/or transmitting data.

The radio node may include a wireless device, and wherein receiving the configuration message comprises receiving the configuration message from a network node.

According to some other embodiments, a method may be provided in a first radio node supporting operations in a Radio Access Network according to first and second UpLink/DownLink subframe configurations, where the first and second UpLink/DownLink subframe configurations are different. The first UpLink/DownLink subframe configuration and the second UpLink/DownLink subframe configuration may be used for operation in a first cell and a second cell respectively, and/or the first UpLink/DownLink subframe configuration and the second UpLink/DownLink subframe configuration may be used in the first cell or the second cell at non-overlapping times. A capability of a second radio node relating to performing a radio operation on signals related to the first cell and/or the second cell may be obtained, and a configuration message may be transmitted to the second radio node relating to the first UpLink/DownLink subframe configuration and/or the second UpLink/DownLink subframe configuration, with the configuration message defining a configuration for operation at the second radio node.

Obtaining the capability of the second radio node may include receiving a capability message from the second radio node wherein the capability message defines the capability of the second radio node relating to the first UpLink/DownLink subframe configuration and/or the second UpLink/DownLink subframe configuration.

The first UpLink/DownLink subframe configuration may include a frequency division duplex (FDD) subframe configuration, and the second UpLink/DownLink subframe configuration may include a time division duplex (TDD) subframe configuration.

The configuration message may include a first configuration message relating to the first UpLink/DownLink subframe configuration defining a first configuration for operation at the second radio node. A second configuration message may be transmitted to the second radio node relating to the second UpLink/DownLink subframe configuration, with the second configuration message defining a second configuration for operation at the second radio node.

A result of at least one of a timing measurement, a received signal measurement, a received quality measurement, a direction measurement, a channel state measurement, and/or a positioning measurement may be received.

The capability of the second radio network node may include a capability of operating with dynamic UpLink/DownLink subframe configurations.

A request for capability information may be transmitted to the second radio node, and obtaining the capability of the second radio node may include receiving a capability message from the second radio node responsive to the request for capability information.

The first radio node may include a network node, and the second radio node may include a wireless device. For example, the network node may be any one of a base station, an eNodeB, a positioning node, a mobility management entity, a radio network controller, a remote radio head, a relay, and/or a location measurement unit.

According to still other embodiments, a wireless device may be capable of operating in a Radio Access Network according to at least first and second UpLink/DownLink subframe configurations, with the first and second UpLink/DownLink subframe configurations being different. The first UpLink/DownLink subframe configuration and the second UpLink/DownLink subframe configuration may be used for operation in a first cell and a second cell respectively, and/or the first UpLink/DownLink subframe configuration and the second UpLink/DownLink subframe configuration may be used in the first cell or the second cell at non-overlapping times. The wireless device may include a transceiver configured to communicate with a radio network node (eNodeB) of the Radio Access Network, and a processor coupled to the transceiver. More particularly, the processor may be configured to execute computer program instructions to receive a configuration message through the transceiver relating to the first UpLink/DownLink subframe configuration and/or the second UpLink/DownLink subframe configuration, and to perform an operation at the radio node on signals transmitted to and/or received from the first cell and/or the second cell based on the configuration message relating to the first UpLink/DownLink subframe configuration and/or the second UpLink/DownLink subframe configurations.

According to yet other embodiments, a radio network node may support operations in a Radio Access Network according to first and second UpLink/DownLink subframe configurations, with the first and second UpLink/DownLink subframe configurations being different. The first UpLink/DownLink subframe configuration and the second UpLink/DownLink subframe configuration may be used for operation in a first cell and a second cell respectively, and/or the first UpLink/DownLink subframe configuration and the second UpLink/DownLink subframe configuration may be used in the first cell or the second cell at non-overlapping times. The radio network node may include a transceiver configured to communicate with a wireless device, and a processor coupled to the transceiver. More particularly, the processor may be configured to obtain a capability of the wireless device relating to performing a radio operation on signals related to the first cell and/or the second cell, and to transmit a configuration message through the transceiver to the wireless device relating to the first UpLink/DownLink subframe configuration and/or the second UpLink/DownLink subframe configuration, wherein the configuration message defines a configuration for operation at the wireless device.

BRIEF DESCRIPTION OF THE DRAWINGS

The accompanying drawings, which are included to provide a further understanding of the disclosure and are incorporated in a constitute a part of the application, illustrate certain non-limiting embodiment(s). In the drawings:

FIG. 10 is a flow chart illustrating operations of base station (eNodeB) of FIG. 8 according to some embodiments.

DETAILED DESCRIPTION

Figure 1:
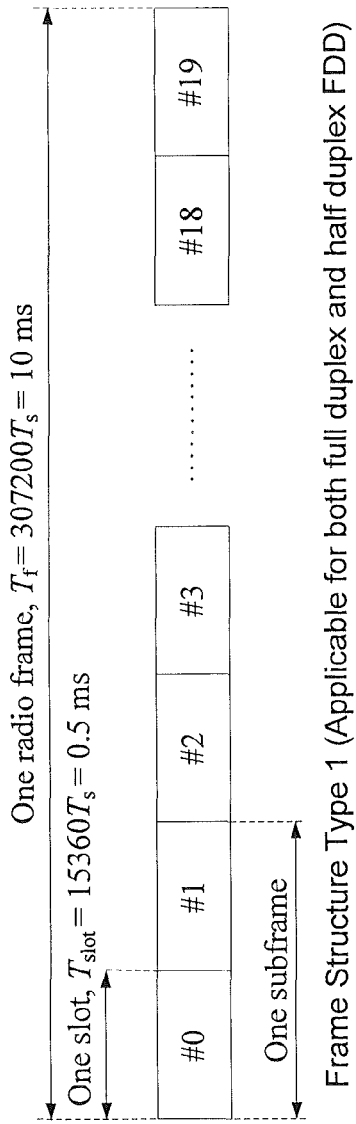
FIG. 1 illustrates a Type 1 frame structure applicable to both full duplex and half duplex frequency division duplex (FDD)
Figure 2:
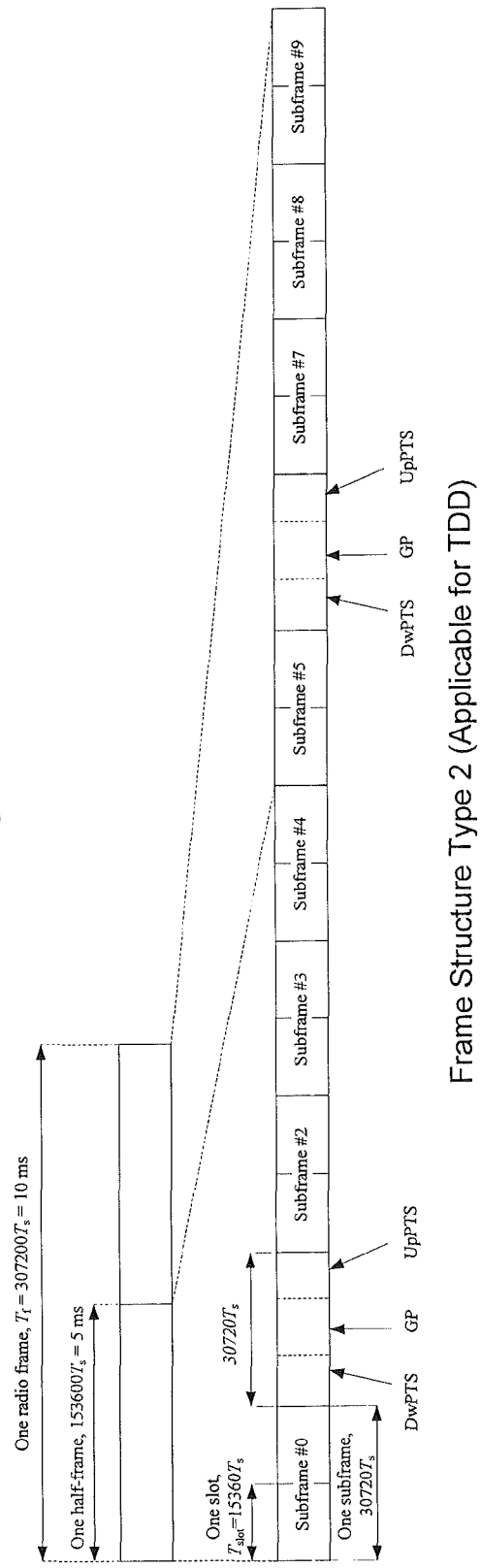
FIG. 2 illustrates a Type 2 frame structure applicable to time division duplex (TDD)

In the following detailed description, numerous specific details are set forth to provide a thorough understanding of present embodiments. However, it will be understood by those skilled in the art that the present embodiments may be practiced without these specific details. In other instances, well-known methods, procedures, components, and circuits have not been described in detail so as not to obscure present embodiments. It is intended that all embodiments disclosed herein can be implemented separately or combined in any way and/or combination.

Problems Addressed According to Some Embodiments

One or more of the following issues may be addressed according to some embodiments disclosed herein:

Some embodiments may address limited or no availability of capability information related to UL/DL subframe configuration, e.g. as follows. A UE's ability to support different UL/DL subframe configurations on different cells may not be signaled to positioning related nodes, e.g., E-SMLC, LME, etc. Only serving radio node and MME may be currently aware of the UE capability to support different and/or dynamic UL/DL configurations, but not other nodes, e.g., radio network nodes not serving UE, positioning node, MDT (Minimization of Drive Tests) node, LMU (Location Measurement Unit), etc. eNodeB capability to support different and/or dynamic UL/DL configurations is currently not signaled to positioning node, SON (Self Organizing Network), wireless device, LMU, etc. There may currently be no LMU capability to support different and/or dynamic UL/DL configurations and it may not therefore be signaled to other nodes, e.g., eNB, positioning node, SON, MME (Mobility Management Entity), coordinating node, or LMU gateway, etc. The UE or any radio node capable of supporting different and/or dynamic UL/DL configurations may not comprise support of operation with different and/or dynamic UL/DL configurations on a specific subset of UL/DL configurations.

Some embodiments may address maintenance of adequate measurement performance under various different UL/DL subframe configurations.

Summary of Proposed Embodiments

According to some embodiments disclosed herein, a radio node has a UL/DL subframe configuration related capability of operating (e.g., performing a measurement), wherein the UL/DL-related capability relates to: an ability to operate with dynamic UL/DL subframe configurations in at least one cell, and/or an ability to operate during an overlapping time period with different UL/DL subframe configurations in at least two cells or with at least two radio nodes, on the same or different frequencies. The capability may or may not be associated with carrier aggregation.

This basic element may be included in example embodiments, for example, as follows, and for the sake of simplicity the basic element may be further referred to as a capability related to UL/DL subframe configuration or a capability described in the basic element:

A method in a network node of configuring a radio node for performing a measurement and/or receiving a message, the method comprises:
Obtaining (e.g., receiving or autonomously determining) a radio node's capability indicating its ability to operate as described above with respect to the basic element; and
Configuring the radio node for performing one or more radio operational tasks which involve use of the relevant capability, with this configuration being performed in response to determining that the radio node supports the relevant capability.

A method in a radio node (e.g., a wireless device or a radio network node) of sending a message and/or performing at least one operation involving use of its own or another radio node's (e.g., served UE or associated RRU or LMU) capability described in the basic element (e.g., performing a measurement), the method comprising:

Signaling a capability described in the basic element (own or another radio node's) to a second node (e.g., wireless device, LMU, or positioning node).

A method in a first radio node (e.g., a wireless device or radio network node) of performing at least one operation involving use of its capability described in the basic element (e.g., performing a measurement), the method comprising:

Signaling its capability described in the basic element to a second node which is one or more of the another wireless device or a positioning node;

Receiving a configuration message for an operation involving use of the first radio node's capability described in the basic element;

Performing the at least one operation involving use of its capability described in the basic element (e.g., performing a measurement).

A method in a radio node (e.g., a wireless device or radio network node) of performing at least one operation involving use of its capability described in the basic element (e.g., performing a measurement) based on a configuration received from another node, the method comprises:

Receiving a configuration message from another wireless device or positioning node for performing at least one operation involving use of its capability described in the basic element (e.g., performing a measurement);

Performing the said at least one operation involving use of its capability described in the basic element (e.g., performing a measurement) while meeting one or more pre-defined requirements according to one or more corresponding pre-defined rules;

Using the result (e.g., a radio measurement) of the said at least one operation involving use of its capability described in the basic element for one or more radio tasks, e.g., measurement reporting, positioning, cell reselection, RRM (Radio Resource Management), SON (Self Organizing Network), MDT (Minimization of Drive Tests), etc.

Detailed Description

A radio node may be characterized by its ability to transmit and/or receive radio signals and it may include a transmitting and/or receiving antenna. A radio node may be a UE (also referred to as a user equipment node and/or a wireless device/terminal) or a radio network node (see corresponding descriptions that follow).

The terms wireless device/terminal and UE are used interchangeably in the description. A wireless device/terminal may represent any device/terminal equipped with a radio interface and capable of at least transmitting and/or receiving a radio signal from another radio node. A wireless device/terminal may also be capable of receiving signals and demodulating them. Wireless devices/terminals described herein may also include certain radio network nodes, e.g., femto base station or femto BS (also known as home BS) that are equipped with a UE-like interface. Examples of wireless devices/terminals include but are not limited to PDAs (personal digital assistants), laptops, mobile telephones, tablet devices, sensors, fixed relays, mobile relays, target devices, and any radio network node equipped with a UE-like interface (e.g., a small RBS, eNodeB, femto BS).

Wireless devices/terminals or UEs may also represent machine-to-machine (M2M) and/or machine type communication (MTC) devices that have limited communication capabilities, such as a wireless meter or other sensor, a digital billboard, a wireless-capable appliance (e.g., a washing machine, digital video recorder (DVR)), a radiofrequency identifier (RFID) tag, or any other device capable of wireless communication with a radio communications network. Elements of an example wireless device/terminal UE are described in greater detail below with respect to FIG. 7.

A radio network node is a radio node in a radio communications network. A radio network node may be capable of receiving radio signals and/or transmitting radio signals in one or more frequencies, and may operate in single-RAT (single Radio Access Technology), multi-RAT, or multi-standard mode (e.g., MSR). A radio network node, including an eNodeB, a RRH (Remote Radio Head), a RRU (Remote Radio Unit), relay, LMU (Location Measurement Unit), or a transmitting-only/receiving-only radio network node, and may or may not create own cell. Some examples of radio network nodes not creating own cell are beacon devices transmitting configured radio signals or measuring nodes receiving and performing measurements on certain signals (e.g., LMUs). A radio network node that does not create own cell may also share a cell or the used cell ID with another radio node which creates own cell, may operate in a cell sector, or may be associated with a radio network node creating own cell. More than one cell or cell sector (commonly named in described embodiments by a generalized term "cell" which may be understood as a cell or its logical or geographical part) may be associated with one radio network node. Further, one or more serving cells (in DL and/or UL) may be configured for a UE, e.g., in a carrier aggregation system where a UE may have one Primary Cell (PCell) and one or more Secondary Cells (SCells). A cell may also be a virtual cell (e.g., characterized by a cell ID but not provide a full cell-like service) associated with a transmit node. The contents of an example radio network node are described in greater detail below with respect to FIG. 8.

A network node may be any radio network node (see the corresponding description) or core network node. Some non-limiting examples of a network node are an eNodeB (also radio network node), RNC (Radio Network Controller), positioning node, MME (Mobility Management Entity), PSAP (Public Safety Answering Point), SON (Self Organizing Network) node, MDT (Minimization of Drive Tests) node, coordinating node, a gateway node (e.g., P-GW or S-GW or LMU gateway or femto gateway), and O&M (Operations and Management aka Operations & Maintenance) node.

The term "coordinating node" used herein is a network and/or node, which coordinates radio resources with one or more radio nodes. Some examples of the coordinating node are network monitoring and configuration node, OSS (Operation Support System) node, O&M, MDT node, SON node, positioning node, MME, a gateway node such as Packet Data Network Gateway (P-GW) or Serving Gateway (S-GW) network node or femto gateway node, a macro node coordinating smaller radio nodes associated with it, eNodeB coordinating resources with other eNodeBs, etc.

The signaling described herein may be either physical-layer signaling or higher-layer (e.g., Layer 2 or Layer 3) signaling, and it may be via direct links or via logical links (e.g., via higher layer protocols and/or via one or more network and/or radio nodes) or other indirect links. For example, signaling from a coordinating node to a UE may also pass another network node, e.g., a radio network node.

The described embodiments are not limited to LTE, but may apply with any Radio Access Network (RAN), single- or multi-RAT. Some other RAT examples are LTE-Advanced, UMTS (Universal Mobile Telecommunications System), HSPA (High Speed Packet Access), GSM (Global System For Mobile Communications), cdma2000, WiMAX, and WiFi.

Proposed embodiments may also be applied to multi-point transmission and/or reception systems, carrier aggregation systems, and multi-point carrier aggregation systems.

The term "subframe" used in embodiments described herein (typically related to LTE) is an example resource in the time domain, and in general it may be any pre-defined time instance or time period.

The term "victim" may apply, for example, to a measured signal or a measured cell (depending on the context), the measurements of which are preformed in high-interference conditions. The term "aggressor" may apply, for example, to a strongly interfering signal or a strongly interfering cell (depending on the context), which interferers with the victim. The signal may be from a radio network node or a wireless device/terminal. Some examples of victim-aggressor relations include: an LTE physical signal interfering with an LTE physical signal (of the same or different type) or interfering with an LTE physical channel; an LTE physical channel interfering with an LTE physical channel (of the same or different type) or an LTE physical signal; a macro cell or its UE interfering with a pico cell or the pico UE; a femto cell or a CSG UE interfering with a non-CSG cell or non-SCG UE; etc.

In some embodiments, the different UL/DL configurations described may include at least one configuration in a non-full duplex mode. In one example, an UL/DL configuration may include, for example, an UL/DL TDD configuration or an UL/DL configuration/scheduling scheme with HD-FDD. Different UL/DL configurations may represent different UL/DL configurations in different cells, different carriers, different bands, different RATs, and/or dynamically changing UL/DL configuration of one or more nodes over time. In one embodiment, the different UL/DL configurations may be further comprised in the same or different RATs.

First Embodiments: Methods of Obtaining and Using Capability Information Related to Different UL/DL Configurations Embodiments described herein may also be combined with embodiments described in other embodiments disclosed herein.

Different UL/DL subframe configurations are as described in generalizations above.

According to a basic element of proposed embodiments, a radio node has a UL/DL subframe configuration related capability of operating (e.g., performing a measurement), wherein the UL/DL related capability relates to an ability to operate with dynamic UL/DL subframe configurations in at least one cell, and/or an ability to operate during an overlapping time period with different UL/DL subframe configurations in at least two cells or with at least two radio nodes, on the same or different frequencies; and/or the capability may or may not be associated with carrier aggregation.

This basic element may be included in example embodiments as described in more detail below and for the sake of simplicity is further referred to as the capability related to UL/DL subframe configuration or the capability described in the basic element.

Attributes of Radio Node's Capability Related to UL/DL Subframe Configuration

In this section, attributes of the capability described in the basic element above are described further.

Relevant operations may include any type of wireless communication and may comprise, for example, any one or more of: receiving a radio signal, performing one or more measurement, performing channel estimation (e.g., to be used for reporting, interference estimation, receiver configuration, performing a measurement, etc.), spectrum sensing, receiving and/or transmitting data, control, etc.

The measurement may be an UL measurement, a DL measurement, or a measurement on radio signals from another wireless device (e.g., in device-to-device communication or discovery). The measurement may be further a one-directional measurement (e.g., only on DL signals or only on UL signals), a two-directional measurement (e.g., RTT or Round Trip Time, UE Rx-Tx Receive-Transmit, eNodeB Rx-Tx Receive-Transmit, etc.), or a measurement on multifarious links, such as those described in further detail in U.S. patent application Ser. No. 61/496,327, "Method and Apparatus for Configuring Enhanced Timing Measurements Involving Multifarious Links," filed Jun. 13, 2011, the disclosure of which is incorporated by reference herein in its entirety. The measurement may involve measuring one or more radio links (e.g., TDOA or Time Difference of Arrival measurement and a measurement on multifarious links involve more than one radio link). The measurement may be, e.g., a timing measurement, a received signal measurement, received quality measurement, direction measurement, channel state measurement, etc. The measurement may be performed for one or more purposes, e.g., RRM (Radio Resource Management), mobility, SON, positioning, MDT, interference coordination, receiver tuning, etc. The measurement may be used internally by the radio node or may be reported to another node. Some further examples of measurements that can be reported to another node can be found in any version of 3GPP TS 36.214, "Evolved Universal Terrestrial Radio Access (E-UTRA); Physical layer; Measurements," such as V 10.1.0, Mar. 30, 2011, the disclosure of which is incorporated by reference herein in its entirety.

Cells with different UL/DL subframe configurations: may belong to the same carrier frequency; or may belong to different carrier frequencies, which in turn may belong to the same frequency band or to a different frequency band; or may all be the UE's serving cells (e.g., in multi-carrier, CoMP or Coordinated Multipoint, etc.); or may all be any combination of serving and neighbor cells of the UE; or may all be the neighbor cells of the UE.

In some embodiments, a capability described in the basic element may further include a subset of supported UL/DL subframe configurations or even supported UL/DL subframe configuration combinations (e.g., in two or more cells and/or two or more radio nodes) in a scenario with different UL/DL subframe configurations.

In other embodiments, the capability described in the basic element may further comprise a set of all UL/DL subframe configurations that may be configured dynamically or even a set of all UL/DL subframe configuration combinations that may be configured dynamically.

In yet other embodiments, the capability described in the basic element may further comprise an unchanged or common set of UL/DL subframes. In still other embodiments, the capability may comprise a flexible set of UL/DL subframes or a set of UL/DL subframes that may differ.

In further embodiments, the capability described in the basic element may further comprise any one or more of the following additional attributes:

- The node's ability to support two or more, but not all, combinations of different static or dynamic UL/DL subframe configurations on different cells, which may be, e.g.:
  - Combinations comprising configurations with the same switch-point periodicity;
  - Combinations comprising configurations with at least K1 DL subframes and/or at least K2 UL subframes;
  - Combinations comprising configurations with at most K3 DL subframes and/or at most K4 UL subframes;
  - Combinations determined by the supported RF band combinations that may be operated in parallel;
- The node's ability to support operation with different UL/DL subframe configurations that may change dynamically (e.g., with a certain frequency change or periodicity);
- The node's ability to support operation on cells with different UL/DL subframe configurations, which depend upon frequency characteristics of frequencies on which cells operate, for example, depending on the RF bands or RF band combinations supported by the node, frequency separation between RF bands of the cells, the interference isolation level between the two UL/DL configurations or RF guard bands (e.g., the capability may not apply for RF bands 42 and 43);
- The node's ability to support same or different combinations of enhanced receiver for performing operation on cells with different UL/DL subframe configurations;
- Two or more from a list of UL/DL subframe configurations with CA, where the list may comprise a list of UL/DL subframe configurations supported for at least one cell (not necessarily a combination of two cells!);
- Two or more from the list of UL/DL subframe configurations without CA;
- Any two or more from the list of UL/DL subframe configurations in high UE activity or low UE activity state. Examples of high activity state are RRC (Radio Resource Control) connected, CELL_DCH or cell dedicated channel (for inter-RAT E-UTRA measurements). Examples of low activity state are RRC_IDLE, CELL_PCH/URA_PCH/CELL_FACH states (for inter-RAT E-UTRA measurements);
- Any two or more from the list of UL/DL subframe configurations for a specific one or more measurements (e.g., a timing measurement, a received signal strength or received signal quality measurement, a direction measurement, a measurement involving multiple links, etc.);
- Any two or more from the list of UL/DL subframe configurations for a specific purpose e.g., positioning, mobility, radio link monitoring, RRM, MDT, SON, network planning etc.
- Any one or more of the above for a specific positioning measurement (e.g., a timing measurement, UE Rx-Tx, eNB Rx-Tx, RTT, RSTD or Reference Signal Time Difference, UL RTOA or Relative Time of Arrival, received signal strength or quality, etc.) or a specific positioning method (e.g., E-CID or enhanced cell identity, OTDOA, UTDOA, hybrid positioning, AECID or Adaptive Enhanced Cell Identity, pattern matching, RF fingerprinting, etc.).

Enhanced Signaling of the Capability Information

One approach to obtain the capability described in the basic element and discussed above in section entitled "Attributes of radio node's capability related to UL/DL subframe configuration" is via signaling (e.g., higher-layer, physical layer, or a combination thereof; dedicated, multicast, or broadcast; direct or via another node).

According to some embodiments herein, a (first) radio node (e.g., a wireless device or a radio network node) maintains its capability described in the basic element and signals this capability to a second node directly or via another node (e.g., via base station and/or RNC and/or MME and/or positioning node or even another radio node). The signaling may be explicit (e.g., comprising supported configurations) or implicit (e.g., a recommended configuration based on said capability, hereby indirectly indicating the capability or at least a subset of supported configurations).

Some embodiments may cover, for example, one or more of the following:

- wireless device capability to support different UL/DL configuration→wireless device
- wireless device capability to support different UL/DL configuration→positioning server
- radio network node (e.g., eNodeB, LMU, etc.) own capability to support different UL/DL configuration→positioning server or LMU
- radio node (e.g., wireless device, eNodeB, LMU, etc.) signals capability of another radio node capability to support different UL/DL configuration→positioning server or LMU
- a two-step chain: wireless device capability to support different UL/DL Configuration→positioning server→to any other node (e.g., LMU or a non-serving eNodeB)

The capability may be provided upon a request (e.g., sent from the second node) or in an unsolicited way, e.g., upon a triggering condition, triggering event (e.g., turning on, registration in the network or network attach, handshaking with another node during interface or connection setup, handover, etc.), or during a session setup.

Autonomous Obtaining of the Radio Node's Capability Related to UL/DL Configuration According to this embodiment, a second node (e.g., a wireless device, a radio network node, or a network node) obtains the first radio node's (e.g., a wireless device or a radio network node) capability described in the basic element autonomously (e.g., by learning, via analyzing configuration reports intended for the second node or for further transmission to another node, received measurement reports, or by performing measurements).

In one example, the second node receives from the first node a recommended measurement configuration, based on the capability described in the basic element.

In another example, a radio network node receives one or more measurement reports from one or more radio nodes and determines an UL/DL subframe configuration of at least one neighbor radio node or cell, based on the received measurement reports. The determined configuration may be stored in the wireless device and further used, as described below.

In yet another example, a network node receives one or more measurement reports from one or more radio nodes and determines UL/DL subframe configuration of at least one radio node measured by the first node and/or comprising the first node, based on the received measurement reports. The determined configuration may be stored in the wireless device and further used, as described below.

In yet another example, a second node receives a message from a first node, the message comprising UL/DL configuration of the first node or another node.

In yet another example, a wireless device (second node) performs measurements on a cell and determines the UL/DL configuration configured in the cell (e.g., by detecting a predefined signal or performing correlation). The determined configuration may be stored in the wireless device and further used, as described below. It may also be further signaled to another node or used internally.

Methods of Using of the Obtained First Node's Capability Information

In one embodiment, the radio node's capability obtained by the second node as described above may be further used by the second node, e.g., as described below.

In one embodiment, the second node receiving the capability may use it for radio operational tasks, e.g., for one or more of:

Signaling to another node (e.g., O&M, SON, etc.);
RRM;
Mobility;
SON;
O&M;
MDT;
A Network management task(s), e.g., tuning of network configuration parameters such as maximum output power, etc.;
Selecting CA configuration for the radio node;
Configuring a CoMP cluster for the radio node;
Time alignment or synchronization control (e.g., for TA or Timing Advance command);
Selecting and signaling/recommending measurement configuration parameters to the radio node or to another node (e.g., the node performing measurements on radio transmissions of the radio node);
Positioning method selection, e.g., between OTDOA and E-CID. For example, the positioning node may select OTDOA if the UE supports capability to support different UL/DL subframe configurations in frequency bands which are also currently used by the network.
Carrier selection for the measurements;
Requesting a certain transmission configuration or configuring transmissions of radio signals to be used for positioning measurements (e.g., selecting a certain reference signal configuration and configuring PRS for DL measurements or SRS for UL measurements), adaptively to the obtained capability information;
Ensuring that a measurement or measurement session (e.g., positioning session) can continue after handover or cell or carrier change;
Configuring a measurement/transmission/reception procedure of the first radio node or another radio node (e.g., number of samples to obtain the measurement, measurement bandwidth, measured signals, measured cells, time instances when the measurement is to be performed, carriers for the measurements, measurement periodicity), adaptively to the obtained capability information of the first radio node.
The node being configured with a measurement/transmission/reception procedure may receive the configuration from the configuring node, wherein the configuring node may be different from the first node, and perform measurement/transmission/reception, based on the received configuration
The configuration may be by the node performing the measurements or by another node (e.g., E-SMLC configures one or more LMUs);

Adaptively depending upon obtained capability information, selecting cells or radio nodes in assistance information sent to a measuring node, e.g., selecting cells for including in the OTDOA assistance data (so that the selected radio node's capability matches with the receiving wireless device's capability) or selecting radio nodes (e.g., LMUs or other wireless devices) for performing UL measurements on radio signals transmitted by a wireless device (so that the selected radio node's capability matches with the transmitting wireless device's capability).

Configuring measurement procedure at a measuring node (e.g., UE, eNodeB, LMU, etc.), which may be the first node, while taking into account the node's capability of supporting different UL/DL subframe configuration and currently configured UL/DL subframe configurations on different links or cells, the said configuration is based on one or more criteria. Examples of such criteria include:

Sending measurement configuration which lead to the most stringent pre-defined measurement requirements such as shorter measurement period, This can be achieved by configuring a larger measurement bandwidth when there is a significant difference between the UL/DL subframe configurations on different cells.

Second Embodiments: Methods of Performing Measurements with Different UL/DL Subframe Configurations and Meeting Associated Requirements Different UL/DL subframe configurations are as described in generalizations in the beginning of the description. The embodiments described herein may also be combined with other embodiments.

This aspect of proposed embodiments may be combined with any other aspect, e.g., based on the available capability information related to different and/or dynamic UL/DL subframe configurations described in the section entitled "Methods of Obtaining And Using Capability Information Related To Different UL/DL Configurations". As in previously discussed embodiments, this embodiment may apply regardless of whether the different UL/DL subframe configurations remain the same or whether they are dynamically changed/reconfigured. Furthermore, this aspect may be applied to positioning measurements, but it is not limited to positioning, e.g., it may also apply for RRM measurements, SON, MDT, mobility, interference coordination enhancements, CA enhancements, enhancements for heterogeneous deployments, etc.

This aspect of proposed embodiments may be applied specifically to measurements on two links with different UL/DL subframe configurations, at least during some time over the transmission/reception. The two links may typically be associated with different cells and may be identified by the UE by the virtue of different cell or node identifiers. The two links may also belong to the same cell sharing the same cell ID between multiple links. In another example, different links may be associated with different antennas or different transmitting/receiving entities, wherein the different antennas and/or the different entities may or may not belong to different radio nodes (e.g., base stations BSs connected to more than one RRHs or wireless device/terminal equipped with multiple antennas). The different links may be uniquely identified as different links by the virtue of link specific reference signal sequence, e.g., channel state information reference signal (CSI-RS). The different links may also have different radio channel characteristics, e.g., delay spread, Doppler shift, channel gain, etc. Embodiments herein may exploit (initiate obtaining thereof) the capability information related to different UL/DL subframe configurations and/or the actual UL/DL subframe configurations in use.

Methods of Performing Measurements Performed on Links with Different UL/DL Subframe Configurations According to some embodiments herein, a method may be implemented in a radio node (e.g., a wireless device or radio network node) or other network node (e.g., a positioning node, SON, MDT node, RNC, eNode B, relay, BS, LMU, etc.) of performing and/or configuring measurements invoking the capability described in first Embodiments discussed above in the section entitled "First Embodiments: Methods of obtaining and using capability information related to different UL/DL configurations". The radio node performing a measurement and/or the node configuring a measurement may be:

the same as the node configuring the different UL/DL subframe configurations, e.g., eNode B configured different UL/DL subframe configurations, and may perform measurement and/or configure UE with measurement using different UL/DL subframe configurations, or different than the node configuring the different UL/DL subframe configurations, e.g., positioning node configuring UE with a positioning measurement, whereas eNode B configures different UL/DL subframe configurations.

The measuring node may also be the node with the capability described in first Embodiments.

Some non-limiting examples of such measurements invoking the capability described in first Embodiments:

Absolute measurements for the two links (e.g., received signal strength or quality);

Relative signal measurements between two links such as between a serving cell and neighbor cell, between two serving cells in CA (e.g., relative RSRQ or Reference Signal Received Quality and relative RSRP or Reference Signal Received Power measurements), etc.;

Two-directional timing measurements involving multifarious radio links (e.g., RTT, UE Rx-Tx, eNodeB Rx-Tx, etc.);

Differential measurements between two radio links (e.g., time difference of arrival such as RSTD or Reference Signal Time Difference); and/or See also measurement description provided above with respect to first Embodiments.

Methods of Meeting Pre-Defined Requirements with Different UL/DL Subframe Configurations The measuring node (e.g., UE, radio network node, etc.) may be required to meet one or more pre-defined requirements associated with a measurement performed on cells or links with different UL/DL subframe configurations. The pre-defined requirements may typically be expressed in terms of one or more pre-defined rules, conditions, etc.

The pre-defined rules and/or pre-defined requirements may be applicable for a particular type of measurement (e.g., RSRP or Reference Signal Received Power, CSI or Channel State Information, etc.), for a group of measurements (e.g., mobility related or positioning related such as RSTD) or for all measurements. The pre-defined rules and/or requirements can also be different for different types of measurements. The requirements may also depend upon activity factors of the signals on which measurement is done (e.g., PRS or Positioning Reference Signals periodicity, CSI-RS or CSI Reference Symbol density, etc.) and/or on activity level of the UE (e.g., DRX or Discontinuous Reception cycle, DTX or Discontinuous Transmission cycle, etc.).

Some examples of the pre-defined requirement may include: a measurement accuracy requirement, a measurement time requirement (e.g., measurement period, measurement reporting delay, cell identification delay, etc.), a channel demodulation requirement, CSI reporting requirement (e.g., CQI or Channel Quality Indication, PMI or Pre-Coding Matrix Indicator, RI or Rank Indicator, etc.), RLM (Radio Link Monitoring) requirement (e.g., out of sync evaluation period, in sync evaluation period, etc.), cell identification requirement, signal reception level and/or signal quality level down to which any requirement is applicable, number of cells or links on which measurement is done over the measurement period, etc. The requirement may be for an intra-frequency, inter-frequency, or inter-RAT measurements.

Several examples of pre-defined rules and/or conditions which can be specified to ensure that the measuring node meets one or more pre-defined requirements when it performs a measurement on cells or links operating with different UL/DL subframe configurations are described below. The following pre-defined rules or conditions may apply to one or any combination of pre-defined requirements for a particular measurement. For example, it may apply only to measurement period but not to measurement accuracy. In another example, it may apply only to number of measured cells but not to any other measurement requirement. One or any combination of the pre-defined rules or conditions governing the pre-defined requirements mentioned below may have to be satisfied by the measuring node:

The measuring node shall meet a second set of pre-defined requirements related to measurements done on cells or links with different UL/DL subframes configurations. The second set of requirements is more relaxed (or less stringent) than the first set of requirements. For example, the second set of requirements can be characterized with a longer measurement period than that used in first set of requirements. The first set of requirements is required to be met when a same UL/DL subframe configuration is used on all cells on which the measurement is done. In one example, second and first sets may use 400 ms and 200 ms of measurement period respectively. In another example, the measurement period may be the same (e.g., 200 ms) but another one or more pre-defined requirements can be relaxed; for instance the number of identified cells (i.e., number of RSRP/RSRQ measurements) required to be measured by the UE is reduced, e.g., from 8 cells to 4 cells on a particular carrier frequency.

The requirement may be more relaxed (e.g., longer measurement time, worse accuracy, longer time to a reporting event, etc.) when different UL/DL subframes configurations are used or apply only with a subset of the different UL/DL subframes configurations (meeting certain conditions) when different UL/DL subframes configurations are used compared to when no different UL/DL subframes configurations are used.

The measuring node shall meet requirements corresponding to one of the two UL/DL subframe configurations, which has least number of DL subframes per frame.

The measuring node shall meet requirements corresponding to one of the two UL/DL subframe configurations, which has least number of UL subframes per frame.

The measuring node shall meet requirements corresponding to one of the two UL/DL subframe configurations, which has least number of measurable subframes per frame. The measurement subframes contain signals which are used by the UE for a particular measurement, e.g., PRS, CSI-RS, RS on new carrier type, etc.

The measuring node shall meet legacy requirements defined for the case of the same UL/DL subframe configuration on different cells provided the measurement is done without measurement gaps, e.g., intra-frequency measurements, measurements on cells on primary and/or on secondary carriers in multi-carrier, etc.

The measuring node shall meet legacy requirements defined for the case of the same UL/DL subframe configuration on different cells provided the measurement is performed using an enhanced receiver by the measuring node or is performed using a specific type of enhanced receiver (e.g., CRS IC capable receiver, also referred to as Cell-specific Reference Signal Interference Cancellation) and/or is performed by an enhanced receiver for which assistance data/information is received from the network.

The measuring node shall meet second set of requirements defined for the case of different UL/DL subframe configurations on different cells provided the measurement is done with measurement gaps, e.g., inter-frequency measurements, inter-RAT measurements, etc.

If any one or both UL/DL subframe configurations is changed while the measuring node is performing a measurement, then the measuring node shall meet the requirements according to one or more of the following rules:
  The measuring node shall continue the on-going measurement;
  The measuring node shall meet the requirements corresponding to the UL/DL subframe configuration with a least number of DL subframes during the measurement period or measurement time, and/or
  The measuring node shall meet the requirements corresponding to the UL/DL subframe configuration with least number of UL subframes during the measurement period or measurement time;
  The measurement requirement shall include delay or reconfiguration time due to every change in the UL/DL subframe configuration during the measurement period or measurement time.

The requirements are required to be met by the measuring node provided any one or more conditions are met, e.g., one or more of:
  UL/DL configuration is changed not more frequent than one measurement time period of a certain measurement (e.g., taking the longest time or requires more complexity);
  UL/DL configuration is changed not more frequent than N times (e.g., N=1 or 2) with time t1 or with a periodicity greater or equal than T1;
  UL/DL configuration is changed at least M times (e.g., M=1 or 2) within time t2 or with a periodicity smaller than T2;
  It is known when the next change will occur, at least time t3 in advance;
  The assistance data needed for the measuring or receiving node is available prior to the change or the measuring/receiving starts after the necessary assistance data is available;
  Sufficient number of DL and/or UL subframes are available within each of the different UL/DL configurations (e.g., for the measurement within a measurement time and/or during every smaller period such as a radio frame or 10 ms), e.g.,
    The minimum of the number of DL subframes in the measured cells (e.g., reference cell and measured neighbor cell for OTDOA positioning) is above a threshold, or, in other words, only the configurations meeting this condition are the applicable configurations
  Sufficient number of overlapping (configured at the same time) DL and/or UL subframes are available for the different UL/DL configurations
  Sufficient number of consecutive DL and/or UL subframes are available for each of the different UL/DL configurations.

In the above, the ensuring may further comprise, e.g., any one or more of:
  For the measuring node, adapt its operation to meet the described requirements, e.g., adapt one or more of: receiver configuration, measurement procedure, activity state, etc.;
  For another node, providing assistance data according to a pre-defined rule (e.g., meeting one or more of the conditions) to ensure that the measuring node is able to meet the described requirements;
  For another node, configuring/scheduling radio signal transmissions to ensure that the measuring node is able to meet the described requirements; and
  For another node, configuring the receiver parameters to perform measurements to ensure that the measuring node is able to meet the described requirements.

Third Embodiments: Methods in a Radio Node of Signaling its Capability Related to UL/DL Configuration and Operating Using the Capability The embodiments described herein may be combined with other embodiments. Different UL/DL subframe configurations are as described in generalizations in the beginning of the description.

In this embodiment, a radio node (e.g., a wireless device or radio network node) performs at least one operation involving use of its capability described in first Embodiments by means of implementing the following example steps:

Step 1: Signaling its capability described in the basic element to a second node (e.g., wireless device, a radio network node, or a positioning node). The signaling may be via conventional signaling (see comments in Step 2) and/or with embodiments described in the Section entitled "Enhanced Signaling of the Capability Information".

Step 2: Receiving from a third node (e.g., wireless device, radio network node, LMU, positioning node) a configuration for an operation involving use of the radio node's capability described in the basic element, wherein said configuration is sent provided the radio node supports the said capability, wherein: the radio node is a wireless device, and the second node and the third node are different; or the radio node is a wireless device, and the second node is the same as the third node and is not the eNodeB serving the radio node; or the radio node is not a wireless device (e.g., being an eNodeB, LMU, etc.), and the second node and the third node may or may not be different.

Step 3: Performing the at least one operation involving use of its capability described in the basic element (e.g., performing a measurement). Step 3 may also be combined with embodiments from second Embodiments, e.g., performing the at least one operation while meeting one or more pre-defined requirements.

Advantages of Proposed Embodiments

Advantages may be provided by certain implementations of the proposed embodiments as follows. The network may be enabled to become aware of a measuring node's ability to measure on cells operating with different UL/DL subframe configurations. The measuring node may be enabled to meet pre-defined requirements when performing measurements on cells with different UL/DL subframe configurations. This may in turn improve the overall system performance. The network may be enabled to be aware of the performance of the measurement performed by the measuring node on cells with different UL/DL subframe configurations. This in turn may lead to more network operational flexibility as it can configure different UL/DL subframe configurations according to traffic demand.

Example Embodiments

Figures 3, 4:
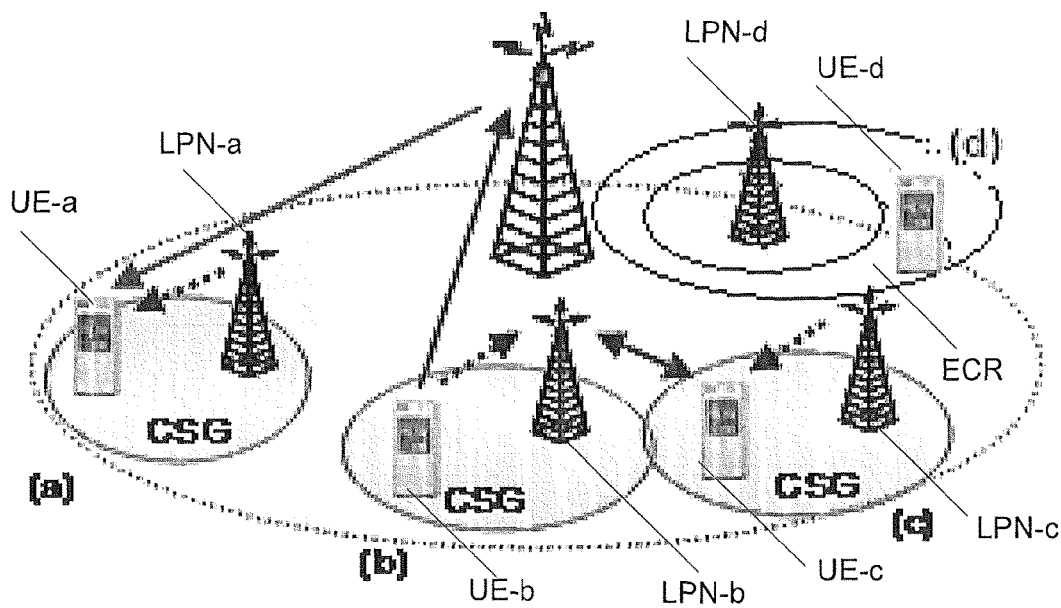
FIG. 3 illustrates UpLink/DownLink (UL/DL) configurations defined according to the 3$^{rd}$ Generation Partnership Project (3GPP)
FIG. 4 illustrates examples of interference in a heterogeneous network deployment.
Figure 5:
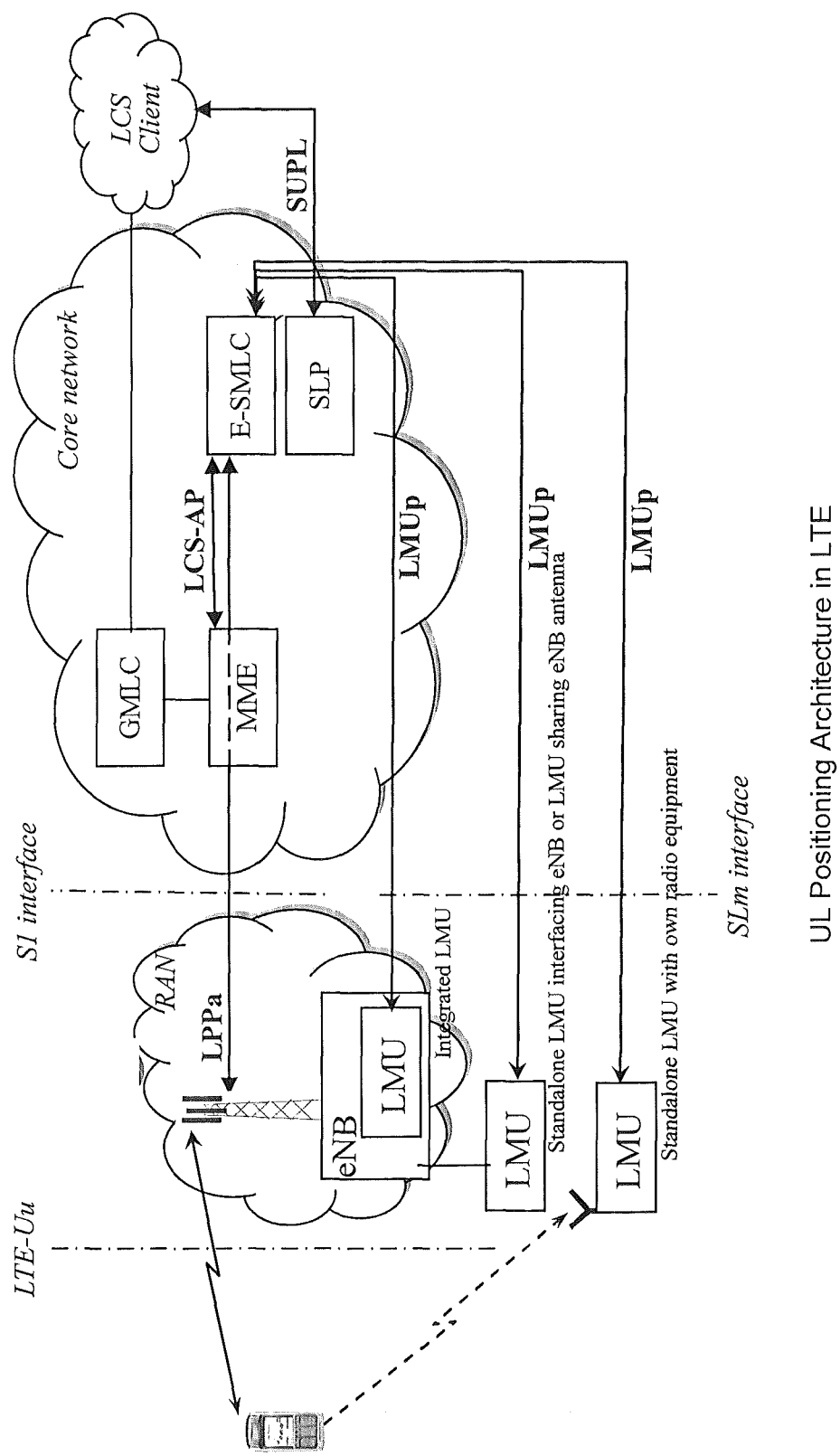
FIG. 5 illustrates network elements in a Long Term Evolution (LTE) UpLink (UL) positioning architecture.
Figure 6:
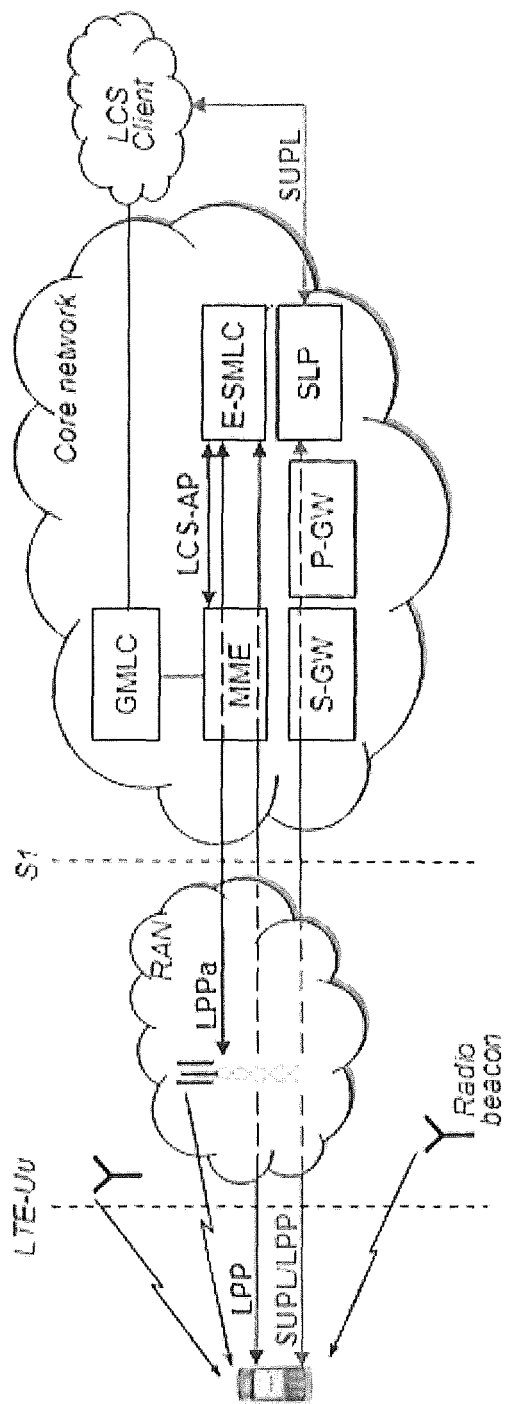
FIG. 6 illustrates network elements in another LTE positioning architecture.

Although the described embodiments may be implemented in any appropriate type of telecommunication system supporting any suitable communication standards and using any suitable components, particular embodiments of the described embodiments may be implemented in an LTE network, such as networks illustrated in FIGS. 4-6.

As shown above, example networks may include one or more instances of wireless devices (e.g., conventional user equipment nodes (UEs), machine type communication (MTC) and/or machine-to-machine (M2M) UEs), and one or more radio network nodes (e.g., eNodeBs or other base stations) capable of communicating with these wireless devices along with any additional elements suitable to support communication between wireless devices or between a wireless device and another communication device (such as a landline telephone). Although the illustrated wireless devices may represent communication devices that include any suitable combination of hardware and/or software, these wireless devices may, in particular embodiments, represent devices such as the example wireless device illustrated in greater detail by FIG. 7. Similarly, although the illustrated radio network node may represent network nodes that include any suitable combination of hardware and/or software, these nodes may, in particular embodiments, represent devices such as the example radio network node illustrated in greater detail by FIG. 8.

Figure 7:
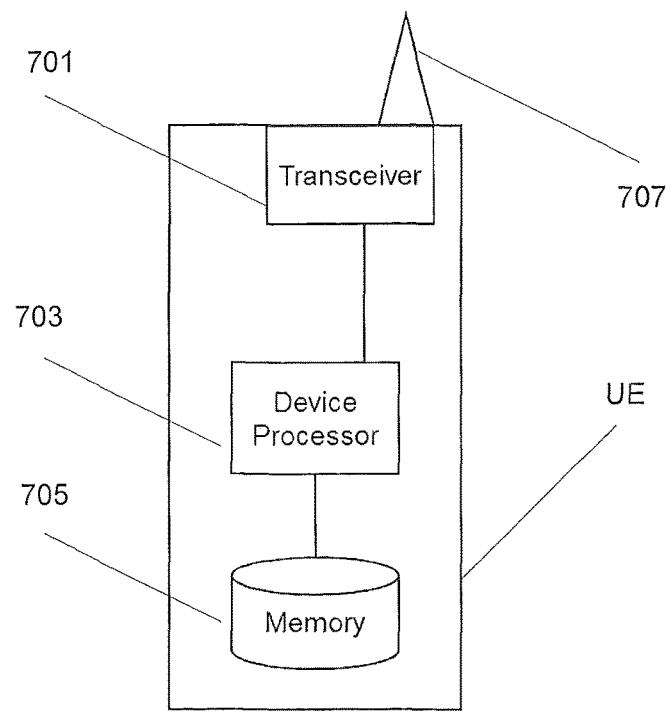
FIG. 7 is a block diagram illustrating a wireless device (UE) according to some embodiments.
Figure 8:
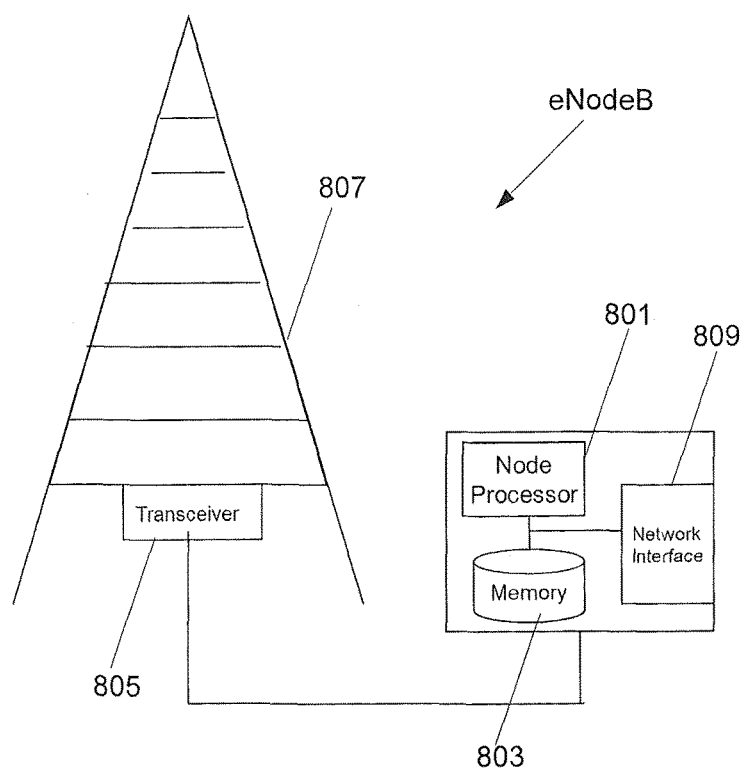
FIG. 8 is a block diagram illustrating a base station (eNodeB) according to some embodiments.

As shown in FIG. 7, the example wireless device UE includes a processor 703, a memory 705, a transceiver 701, and an antenna 707. In particular embodiments, some or all of the functionality described above as being provided by UEs, MTC/M2M devices, and/or any other types of wireless devices may be provided by the device processor 703 executing instructions stored on a computer-readable medium, such as the memory 705 shown in FIG. 7. Alternative embodiments of the wireless device UE may include additional components beyond those shown in FIG. 7 that may be responsible for providing certain aspects of the device's functionality, including any of the functionality described above and/or any functionality necessary/useful to support the embodiments described above. As shown in FIG. 8, the example radio network node eNodeB includes a processor 801, a memory 803, a transceiver 805, and an antenna 807. Radio network node eNodeB may also include a network interface 809 provide communication coupling with other elements/nodes of a Radio Access Network RAN. In particular embodiments, some or all of the functionality described above as being provided by a base station, a nodeB, an enhanced nodeB, and/or any other type of network node may be provided by the node processor 801 executing instructions stored on a computer-readable medium, such as the memory 803 shown in FIG. 8. Alternative embodiments of the radio network node eNodeB may include additional components responsible for providing additional functionality, including any of the functionality identified above and/or any functionality necessary/useful to support the embodiments described above.

Figure 9:
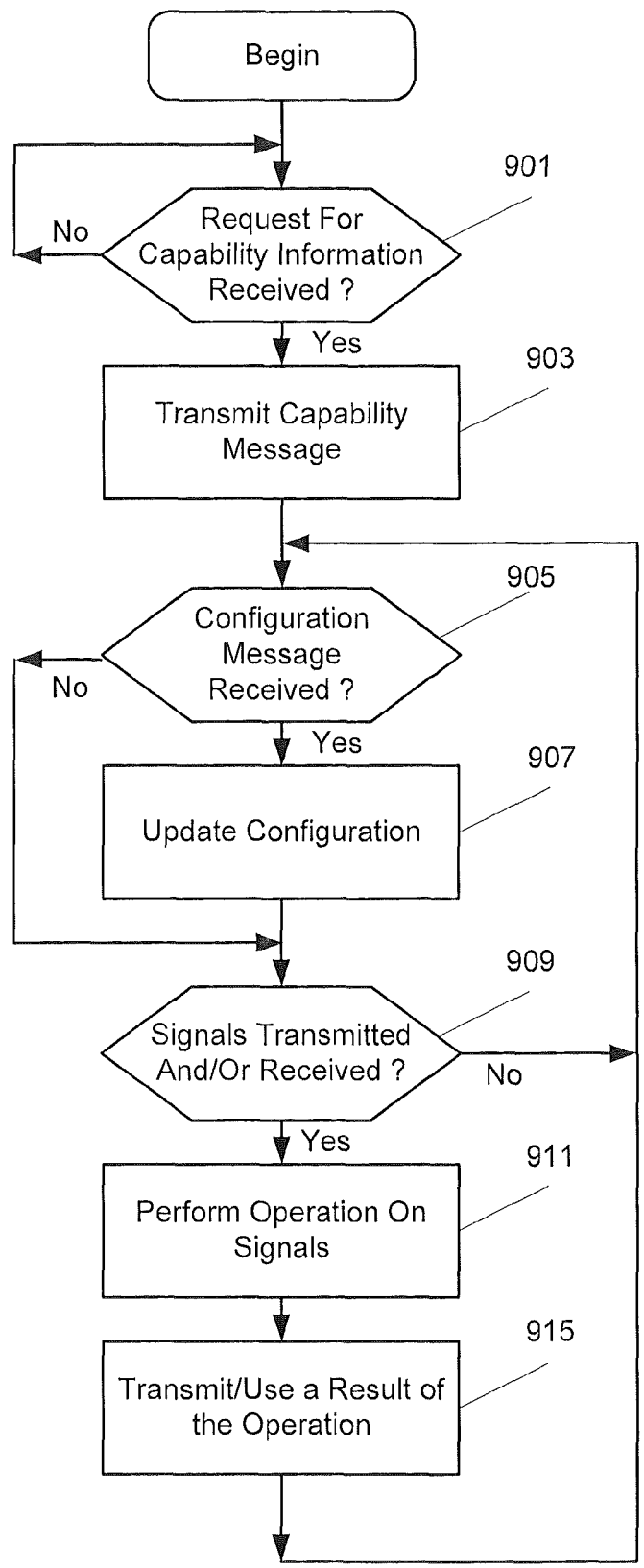
FIG. 9 is a flow chart illustrating operations of wireless device (UE) of FIG. 7 according to some embodiments.

FIG. 9 is a flowchart illustrating operations of wireless device UE of FIG. 7 according to some embodiments. For example, wireless device UE may operate in a Radio Access Network according to at least first and second UpLink/DownLink subframe configurations, where the first and second UpLink/DownLink subframe configurations are different. More particularly, the first UpLink/DownLink subframe configuration and the second UpLink/DownLink subframe configuration may be used for operation in a first cell and a second cell respectively, and/or the first UpLink/DownLink subframe configuration and the second UpLink/DownLink subframe configuration may be used in the first cell or the second cell at non-overlapping times. As discussed above, wireless device UE may include transceiver 701 configured to communicate with radio network node eNodeB of the Radio Access Network and processor 703 coupled to the transceiver, and the processor 703 may be configured to execute computer program instructions that may be stored, for example, in memory 705. Such operations of processor/transceiver 703/701 are discussed in greater detail below with respect to FIG. 9.

At block 901, processor 703 may wait for a request for capability information. Responsive to receiving a request for capability information from a network node (e.g., a base station of the radio access network) at processor 703 through transceiver 701 over a radio interface at block 901, processor 703 may transmit a capability message to the network node at block 903, wherein the capability message defines a capability of wireless terminal UE relating to performing the radio operation on signals related to the first cell and/or the second cell. For example, the capability of the first radio network node may include a capability of operating with dynamic UpLink/DownLink subframe configurations.

At block 905, processor 703 may receive a configuration message from the network node through transceiver 701 relating to the first UpLink/DownLink subframe configuration and/or the second UpLink/DownLink subframe configuration. Responsive to receiving the configuration message at block 905, processor 703 may update its configuration at block 907.

According to some embodiments, the first UpLink/DownLink subframe configuration may be a frequency division duplex (FDD) subframe configuration, and the second UpLink/DownLink subframe configuration may be a time division duplex (TDD) subframe configuration. According to some other embodiments, the first UpLink/DownLink subframe configuration may be a first time division duplex (TDD) subframe configuration, and the second UpLink/DownLink subframe configuration may be a second time division duplex (TDD) subframe configuration. According to still other embodiments, the first UpLink/DownLink subframe configuration may be a first half duplex frequency division duplex (HD-FDD) subframe configuration, and the second UpLink/DownLink subframe configuration may be a second half duplex frequency division duplex (HD-FDD) subframe configuration. According to yet other embodiments, the first UpLink/DownLink subframe configuration may be a half duplex frequency division duplex (HD-FDD)

subframe configuration, and the second UpLink/DownLink subframe configuration may be a time division duplex (TDD) subframe configuration. According to more embodiments, the first UpLink/DownLink subframe configuration may be a half duplex frequency division duplex (HD-FDD) subframe configuration, and the second UpLink/DownLink subframe configuration may be a frequency division duplex (FDD) subframe configuration.

Responsive to transmitting and/or receiving signals from a network node (through transceiver 701) at block 909, processor 703 may perform an operation on the signals transmitted to and/or received from the first cell and/or the second cell at block 911 based on the configuration message relating to the first UpLink/DownLink subframe configuration and/or the second UpLink/DownLink subframe configuration.

According to some embodiments, performing the operation at block 911 may include performing a measurement based on the configuration message relating to the first UpLink/DownLink subframe configuration and/or the second UpLink/DownLink subframe configuration. For example, the measurement may include at least one of a timing measurement, a received signal measurement, a received quality measurement, a direction measurement, a channel state measurement, and/or a positioning measurement. According to some other embodiments, performing the operation at block 911 based on the configuration message may include at least one of receiving a radio signal, performing a measurement, performing channel estimation, sensing spectrum, receiving data, and/or transmitting data.

At block 915, processor 703 may transmit and/or use a result of the operation of block 911. According to some embodiments, processor 703 may transmit a result of the operation through transceiver 701 to a second radio node (e.g., to a network node) over a wireless channel at block 915. According to some other embodiments, processor 703 may use a result of the operation based on the configuration message at block 915 to perform at least one of measurement reporting, positioning, cell reselection, radio resource management, self organization, minimization of drive tests, mobility, interference coordination, and/or receiver tuning.

Processor 703 may repeat operations of blocks 909, 911, and/or 915 according to a same configuration until a new configuration message is received at block 905. For example, the first configuration message discussed above with respect to blocks 905 and 907 may identify the first UpLink/DownLink subframe configuration.

Responsive to receiving a second configuration message identifying the second UpLink/DownLink subframe configuration for operations at the radio node at block 905, processor 703 may update its configuration at block 907. Responsive to signals being transmitted and/or received through transceiver 701 to/from a network node at block 909, processor 703 may perform an operation at block 911 based on the second configuration message identifying the second UpLink/DownLink subframe configuration. For example, processor 703 may perform measurements at block 911 based on the first UpLink/DownLink subframe configuration before receiving the second configuration message, and processor 703 may perform measurements at block 911 based on the second UpLink/DownLink subframe configuration after receiving the second configuration message.

While operations of FIG. 9 are discussed above with respect to operations of wireless device UE of FIG. 7 according to some embodiments, operations of FIG. 9 may be applied at other communication nodes (e.g., radio access network nodes).

FIG. 10 is a flowchart illustrating operations of radio network node eNodeB according to some embodiments. For example, radio network node eNodeB may support operations in a Radio Access Network according to first and second UpLink/DownLink subframe configurations, where the first and second UpLink/DownLink subframe configurations are different. The first UpLink/DownLink subframe configuration and the second UpLink/DownLink subframe configuration may be used for operation in a first cell and a second cell respectively, and/or the first UpLink/DownLink subframe configuration and the second UpLink/DownLink subframe configuration may be used in the first cell or the second cell at non-overlapping times. As discussed above, the radio network node may include transceiver 805 configured to communicate with wireless device UE and processor 801 coupled to the transceiver, and processor 801 may be configured to execute computer program instructions that may be stored, for example, in memory 803. Such operations of processor/transceiver 803/805 are discussed in greater detail below with respect to FIG. 10.

At block 1001, processor 801 may transmit a request for capability information through transceiver 805 to wireless device UE (e.g., as discussed above with respect to block 901 of FIG. 9). The request may be transmitted, for example responsive to wireless device UE initiating service with radio network node eNodeB. At block 1003, processor 801 may obtain a capability of wireless terminal UE relating to performing a radio operation on signals related to the first cell and/or the second cell. For example, processor 801 may obtain the capability of wireless device UE by receiving the capability message from wireless device UE through transceiver 805 responsive to the request for capability information. According to some other embodiments, wireless device UE may initiate transmitting the capability message wireless the request of block 1001.

Responsive to obtaining the capability of wireless device UE at block 1003, processor 803 may transmit a configuration message through transceiver 805 to wireless device UE at block 1005, where the configuration message relates to the first UpLink/DownLink subframe configuration and/or the second UpLink/DownLink subframe configuration, and the configuration message defines a configuration for operation at wireless device UE. In addition, processor 803 may transmit information regarding the capability of wireless device UE to another network node. For example, the information regarding the capability of wireless device UE may be transmitted responsive to obtaining the capability at block 1003, and/or the information regarding the capability of wireless device UE may be transmitted at block 1005 before/after/while transmitting the configuration message.

Obtaining the capability of wireless device UE at block 1003 may thus include receiving a capability message from wireless device UE through transceiver 805 where the capability message defines the capability of wireless device UE relating to the first UpLink/DownLink subframe configuration and/or the second UpLink/DownLink subframe configuration. For example, a capability of wireless device UE may include a capability of operating with dynamic UpLink/DownLink subframe configurations.

According to some embodiments, the first UpLink/DownLink subframe configuration may be a frequency division duplex (FDD) subframe configuration, and the second UpLink/DownLink subframe configuration may be a time division duplex (TDD) subframe configuration. According to some other embodiments, the first UpLink/DownLink subframe configuration may be a first time division duplex (TDD) subframe configuration, and the second UpLink/

DownLink subframe configuration may be a second time division duplex (TDD) subframe configuration. According to still other embodiments, the first UpLink/DownLink subframe configuration may be a first half duplex frequency division duplex (HD-FDD) subframe configuration, and the second UpLink/DownLink subframe configuration may be a second half duplex frequency division duplex (HD-FDD) subframe configuration. According to yet other embodiments, the first UpLink/DownLink subframe configuration may be a half duplex frequency division duplex (HD-FDD) subframe configuration, and the second UpLink/DownLink subframe configuration may be a time division duplex (TDD) subframe configuration. According to more embodiments, the first UpLink/DownLink subframe configuration may be a half duplex frequency division duplex (HD-FDD) subframe configuration, and the second UpLink/DownLink subframe configuration may be a frequency division duplex (FDD) subframe configuration.

At block 1007, processor 801 may transmit/receive signals through transceiver 805 to/from wireless device UE, and at block 1009, processor 801 may receive a result of at least one of a timing measurement, a received signal measurement, a received quality measurement, a direction measurement, a channel state measurement, and/or a positioning measurement. More particular, processor 801 may receive the result from wireless device UE through transceiver 805 where the result corresponds to the signals transmitted/received at block 1007.

Operations of blocks 1007 and 1009 may be repeated for communications with wireless device UE according to the same configuration for wireless device UE until a new configuration is designated at block 1011. Responsive to designating a new configuration at block 1011, processor 801 may transmit (1005) a second configuration message through transceiver 805 to wireless device UE at block 1005, where the second configuration message relates to the second UpLink/DownLink subframe configuration, and the second configuration message defines a second configuration for operation at wireless device UE. Operations of blocks 1007 and 1009 may then be repeated in accordance with the second configuration.

While operations of FIG. 10 are discussed above with respect to operations of base station eNodeB of FIG. 8 according to some embodiments, operations of FIG. 10 may be applied at other network nodes such as an eNodeB, a positioning node, a mobility management entity, a radio network controller, a remote radio head, a relay, and/or a location measurement unit.

Abbreviations

3GPP 3rd Generation Partnership Project
BS Base Station
CA Carrier Aggregation
CQI Channel Quality Indication
CSI Channel State Information
CRS Cell-specific Reference Signal
DL DownLink
DRX Discontinuous Reception
TX Discontinuous Transmission
EARFCN EUTRA Absolute Radio Frequency Channel Number
eNodeB evolved Node B
E-SMLC Evolved SMLC
E-UTRA Evolved Universal Terrestrial Radio Access
FACH Forward Access Channel
FDD Frequency Division Duplex
HD-FDD Half Duplex FDD
HSPA High Speed Packet Access
IC Interference Cancellation
LCS Location Service
LCS-AP LCS Application Protocol
LTE Long-Term Evolution
LMU Location Measurement Unit
MDT Minimization of Drive Tests
MIMO Multiple Input Multiple Output
MME Mobility Management Entity
OMA Open Mobile Alliance
OTDOA Observed Time Difference of Arrival
PCH Paging Channel
PCI Physical Cell Identity
PLMN Public Land Mobile Network
PMI Pre-Coding Matrix Indicator
PRS Positioning Reference Signals
RBS Radio Base Station
RF Radio Frequency
RI Rank Indicator
RLM Radio Link Monitoring
RRM Radio Resource Management
RRC Radio Resource Control
RRU Remote Radio Unit
RS Reference Symbol
RSRP Reference Signal Received Power
RSRQ Reference Signal Received Quality
RSSI Received Signal Strength Indicator
RSTD Reference Signal Time Difference
RTOA Relative Time of Arrival
RTT Round Trip Time
Rx Receive
SINR Signal-to-Interference Ratio
SLP SUPL Location Platform
SMLC Serving Mobile Location Center
SON Self Organizing Network
SRS Sounding Reference Signals
SUPL Secure User Plane Location
TDD Time Division Duplex
TDOA Time Difference of Arrival
Tx Transmit
UE User Equipment
UL UpLink
ULP User-plane Location Protocol
UMTS Universal Mobile Telecommunications System
URA UTRAN Registration Area
UTDOA UL Time Difference of Arrival
UTRA Universal Terrestrial Radio Access
UTRAN Universal Terrestrial Radio Access Network

Further Definitions and Embodiments

In the above-description of various embodiments, it is to be understood that the terminology used herein is for the purpose of describing particular embodiments only and is not intended to be limiting of embodiments. Unless otherwise defined, all terms (including technical and scientific terms) used herein have the same meaning as commonly understood by one of ordinary skill in the art to which present embodiments belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present embodiments. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present embodiments. All such variations and modifications are intended to be included herein within the scope of present embodiments.

That which is claimed is:

1. A method in a wireless device capable of operating in a Radio Access Network according to at least a first UpLink/DownLink subframe configuration comprising a frequency division duplex (FDD) subframe configuration and a second UpLink/DownLink subframe configuration comprising a time division duplex (TDD) subframe configuration, wherein the first and second UpLink/DownLink subframe configurations are different, wherein the first UpLink/DownLink subframe configuration comprising the FDD subframe configuration and the second UpLink/DownLink subframe configuration comprising the TDD subframe configuration are used for operation in a first cell and a second cell respectively and/or wherein the first UpLink/DownLink subframe configuration comprising the FDD subframe configuration and the second UpLink/DownLink subframe configuration comprising the TDD subframe configuration are used in the first cell at non-overlapping times or in the second cell at non-overlapping times, the method comprising:
- receiving a configuration message at the wireless device relating to the first UpLink/DownLink subframe configuration comprising the FDD subframe configuration and/or the second UpLink/DownLink subframe configuration comprising the TDD subframe configuration, wherein the wireless device is capable of operating according to at least the first UpLink/DownLink subframe configuration comprising the FDD subframe configuration and the second UpLink/DownLink subframe configuration comprising the TDD subframe configuration and wherein receiving the configuration message at the wireless device comprises receiving the configuration message from a network node different from a radio network node serving the wireless device; and
- performing an operation at the wireless device on signals transmitted to and/or received from the first cell and/or the second cell based on the configuration message relating to the first UpLink/DownLink subframe configuration comprising the FDD subframe configuration and/or the second UpLink/DownLink subframe configuration comprising the TDD subframe configuration.

2. The method of claim 1 wherein the FDD subframe configuration comprises a half duplex frequency division duplex, HD-FDD, subframe configuration.

3. The method of claim 1 wherein the FDD subframe configuration comprises a full duplex frequency division duplex subframe configuration.

4. The method of claim 1, wherein the configuration message comprises a first configuration message identifying the first UpLink/DownLink subframe configuration comprising the FDD subframe configuration for operations at the wireless device, and wherein performing the operation comprises performing a first operation based on the first configuration message identifying the first UpLink/DownLink subframe configuration comprising the FDD subframe configuration, the method further comprising:
- receiving a second configuration message identifying the second UpLink/DownLink subframe configuration comprising the TDD subframe configuration for operations at the wireless device; and
- performing a second operation at the wireless device based on the second configuration message identifying the second UpLink/DownLink subframe configuration comprising the TDD subframe configuration.

5. The method of claim 4 wherein performing the first operation comprises performing a first measurement based on the first UpLink/DownLink subframe configuration comprising the FDD subframe configuration, and wherein performing the second operation comprises performing a second measurement based on the second UpLink/DownLink subframe configuration comprising the TDD subframe configuration.

6. The method of claim 1, wherein performing the operation comprises performing a measurement based on the configuration message relating to the first UpLink/DownLink subframe configuration comprising the FDD subframe configuration and/or the second UpLink/DownLink subframe configuration comprising the TDD subframe configuration.

7. The method of claim 6 wherein the measurement comprises at least one of a timing measurement, a received signal measurement, a received quality measurement, a direction measurement, a channel state measurement, and/or a positioning measurement.

8. The method of claim 1, the method further comprising:
- transmitting a result of the operation to a radio network node.

9. The method of claim 1, wherein receiving the configuration message comprises receiving the configuration message from a radio network node over a radio interface, the method further comprising:
- transmitting a capability message to the radio network node wherein the capability message defines a capability of the wireless device relating to performing the radio operation on signals related to the first cell and/or the second cell.

10. The method of claim 9 wherein the capability of the wireless device comprises a capability of operating with dynamic UpLink/DownLink subframe configurations comprising the FDD subframe configuration and the TDD subframe configuration.

11. The method of claim 9, further comprising:
- receiving a request for capability information from the radio network node,
- wherein transmitting the capability message comprises transmitting the capability message responsive to receiving the request for the capability information.

12. The method of claim 1, further comprising:
- using a result of the operation at the wireless device based on the configuration message to perform measurement reporting.

13. The method of claim 1, wherein performing an operation at the wireless device based on the configuration message comprises at least one of performing a measurement, performing channel estimation, and/or sensing spectrum.

14. The method of claim 1, wherein the wireless device is a node different from a first radio network node transmitting signals to the first cell using the first UpLink/DownLink subframe configuration comprising the FDD subframe configuration and different from a second radio network node serving the wireless device transmitting the signals to the second cell using the second UpLink/DownLink subframe configuration comprising the TDD subframe configuration.

15. A method in a network node supporting operations in a Radio Access Network according to a first UpLink/DownLink subframe configuration comprising a frequency division duplex (FDD) subframe configuration and a second UpLink/DownLink subframe configuration comprising a time division duplex (TDD) subframe configuration, wherein the first and second UpLink/DownLink subframe configurations are different, wherein the first UpLink/DownLink subframe configuration comprising the FDD subframe configuration and the second UpLink/DownLink subframe configuration comprising the TDD subframe configuration are used for operation in a first cell and a second cell respectively and/or wherein the first UpLink/DownLink subframe configuration comprising the FDD subframe configuration and the second UpLink/DownLink subframe configuration comprising the TDD subframe configuration are used in the first cell at non-overlapping times or in the second cell at non-overlapping times, the method comprising:
- obtaining a capability of a wireless device relating to performing a radio operation on signals related to the first cell and/or the second cell, wherein the capability further relates to a capability of the wireless device of operating according to at least the first UpLink/DownLink subframe configuration comprising the FDD subframe configuration and the second UpLink/DownLink subframe configuration comprising the TDD subframe configuration; and
- transmitting a configuration message to the wireless device relating to the first UpLink/DownLink subframe configuration comprising the FDD subframe configuration and/or the second UpLink/DownLink subframe configuration comprising the TDD subframe configuration, wherein the configuration message defines a configuration for operation at the wireless device, and wherein the network node differs from a radio network node serving the wireless device.

16. The method of claim 15, wherein the FDD subframe configuration comprises a half duplex frequency division duplex (HD-FDD) subframe configuration.

17. The method of claim 15, wherein the FDD subframe configuration comprises a full duplex frequency division duplex subframe configuration.

18. The method of claim 15, wherein the configuration message comprises a first configuration message relating to the first UpLink/DownLink subframe configuration comprising the FDD subframe configuration defining a first configuration for operation at the wireless device, the method further comprising:
- transmitting a second configuration message to the wireless device relating to the second UpLink/DownLink subframe configuration comprising the TDD subframe configuration, wherein the second configuration message defines a second configuration for operation at the wireless device.

19. The method of claim 15, further comprising:
receiving a result of at least one of a timing measurement, a received signal measurement, a received quality measurement, a direction measurement, a channel state measurement, and/or a positioning measurement.

20. The method of claim 15, wherein the capability of the wireless device comprises a capability of operating with dynamic UpLink/DownLink subframe configurations using the FDD and TDD subframe configurations.

21. The method of claim 15, further comprising:
transmitting a request for capability information to the wireless device,
wherein obtaining the capability of the wireless device comprises receiving a capability message from the wireless device responsive to the request for capability information.

22. The method of claim 15, wherein the network node is a first network node, and the method further comprises:
transmitting the received capability information of the wireless device to a second network node.

23. The method of claim 15, wherein the network node is any one of a positioning node, a mobility management entity, a radio network controller, a remote radio head, a relay, and/or a location measurement unit.

24. A wireless device (UE) capable of operating in a Radio Access Network that includes a radio network node (eNodeB) that serves the wireless device, wherein the wireless device operates according to at least a first UpLink/DownLink subframe configuration comprising a frequency division duplex (FDD) subframe configuration and a second UpLink/DownLink subframe configuration comprising a time division duplex (TDD) subframe configuration, wherein the first and second UpLink/DownLink subframe configurations are different, wherein the first UpLink/DownLink subframe configuration comprising the FDD subframe configuration and the second UpLink/DownLink subframe configuration comprising the TDD subframe configuration are used for operation in a first cell and a second cell respectively and/or wherein the first UpLink/DownLink subframe configuration comprising the FDD subframe configuration and the second UpLink/DownLink subframe configuration comprising the TDD subframe configuration are used in the first cell at non-overlapping times or in the second cell at non-overlapping times, the wireless device comprising:
- a transceiver configured to communicate with the radio network node (eNodeB) that serves the wireless device and a network node different from the radio network node (eNodeB) that serves the wireless device; and
- a processor coupled to the transceiver, wherein the processor is configured to execute computer program instructions to perform operations comprising:
  - receiving a configuration message through the transceiver relating to the first UpLink/DownLink subframe configuration comprising the FDD subframe configuration and/or the second UpLink/DownLink subframe configuration comprising the TDD subframe configuration, wherein receiving the configuration message through the transceiver comprises receiving the configuration message from the network node different from the radio network node (eNodeB) that serves the wireless device, and
  - performing an operation at the wireless device on signals transmitted to and/or received from the first cell and/or the second cell based on the configuration message relating to the first UpLink/DownLink subframe configuration comprising the FDD subframe configuration and/or the second UpLink/DownLink subframe configuration comprising the TDD subframe configuration;
- wherein the wireless device is configured to operate according to at least the first UpLink/DownLink subframe configuration comprising the FDD subframe configuration and the second UpLink/DownLink subframe configuration comprising the TDD subframe configuration.

25. A network node supporting operations in a Radio Access Network according to a first UpLink/DownLink configuration comprising a frequency division duplex (FDD) subframe configuration and a second UpLink/DownLink subframe configuration comprising a time division duplex (TDD) subframe configuration, wherein the first and second UpLink/DownLink subframe configurations are different, wherein the first UpLink/DownLink subframe configuration comprising the FDD subframe configuration and the second UpLink/DownLink subframe configuration comprising the TDD subframe configuration are used for operation in a first cell and a second cell respectively and/or wherein the first UpLink/DownLink subframe configuration comprising the FDD subframe configuration and the second UpLink/DownLink subframe configuration comprising the TDD subframe configuration are used in the first cell at non-overlapping times or in the second cell at non-overlapping times, the network node comprising:
  a transceiver configured to communicate with a wireless device (UE); and
  a processor coupled to the transceiver, wherein the processor is configured to perform operations comprising:
    obtaining a capability of the wireless device relating to performing a radio operation on signals related to the first cell and/or the second cell, wherein the capability further relates to a capability of the wireless device of operating according to at least the first UpLink/DownLink subframe configuration comprising the FDD subframe configuration and the second UpLink/DownLink subframe configuration comprising the TDD subframe configuration; and
    transmitting a configuration message through the transceiver to the wireless device relating to the first UpLink/DownLink subframe configuration comprising the FDD subframe configuration and/or the second UpLink/DownLink subframe configuration comprising the TDD subframe configuration, wherein the configuration message defines a configuration for operation at the wireless device, wherein the network node differs from a radio network node serving the wireless device.

26. The wireless device of claim 24, wherein the processor is further configured to perform operations comprising:
  using a result of the operation at the wireless device based on the configuration message to perform measurement reporting.

27. The wireless device of claim 24, wherein the configuration message comprises a first configuration message identifying the first UpLink/DownLink subframe configuration comprising the FDD subframe configuration for operations at the wireless device, and wherein performing the operation comprises performing a first operation based on the first configuration message identifying the first UpLink/DownLink subframe configuration comprising the FDD subframe configuration, wherein the processor is further configured to execute computer program instructions to perform operations comprising:
  receiving a second configuration message identifying the second UpLink/DownLink subframe configuration comprising the TDD subframe configuration for operations at the wireless device; and
  performing a second operation at the wireless device based on the second configuration message identifying the second UpLink/DownLink subframe configuration comprising the TDD subframe configuration.

28. The network node of claim 25, wherein the configuration message comprises a first configuration message relating to the first UpLink/DownLink subframe configuration comprising the FDD subframe configuration defining a first configuration for operation at the wireless device, wherein the processor is further configured to perform operations comprising:
  transmitting a second configuration message to the wireless device relating to the second UpLink/DownLink subframe configuration comprising the TDD subframe configuration, wherein the second configuration message defines a second configuration for operation at the wireless device.

29. The method of claim 1, wherein the operation comprises at least one of performing a received signal measurement and/or a receive quality measurement, wherein the at least one of the received signal measurement and/or the received quality measurement is performed at the wireless device conditioned on a sufficient number of DownLink and/or UpLink subframes being available within each of the UpLink/DownLink subframe configurations comprising the FDD subframe configuration and the TDD subframe configuration.

30. The method of claim 29, wherein the sufficient number of DownLink and/or UpLink subframes comprises at least a number of DownLink and/or UpLink subframes suitable for performing the signal measurement and/or the quality measurement within a measurement time.

* * * * *